(12) United States Patent
Wilson et al.

(10) Patent No.: US 10,151,090 B2
(45) Date of Patent: Dec. 11, 2018

(54) FLUSH ACTUATOR

(71) Applicant: SLOAN VALVE COMPANY, Franklin Park, IL (US)

(72) Inventors: John Wilson, Naperville, IL (US); Kay Herbert, Winthrop, MA (US); Xiaoxiong Mo, Lexington, MA (US); Alfred J. Costa, Pepperell, MA (US); Joshua D. Anthony, Billerica, MA (US); Klaus H. Renner, Hollis, NH (US); Matthew T. Kowalczyk, Natick, MA (US); Joshua P. Kinsley, Needham, MA (US)

(73) Assignee: SLOAN VALVE COMPANY, Franklin Park, IL (US)

( * ) Notice: Subject to any disclaimer, the term of this patent is extended or adjusted under 35 U.S.C. 154(b) by 0 days.

(21) Appl. No.: 15/495,544

(22) Filed: Apr. 24, 2017

(65) Prior Publication Data

US 2017/0226721 A1   Aug. 10, 2017

Related U.S. Application Data

(62) Division of application No. 14/209,618, filed on Mar. 13, 2014, now Pat. No. 9,644,759.

(60) Provisional application No. 61/788,733, filed on Mar. 15, 2013.

(51) Int. Cl.
    *E03D 5/10*     (2006.01)
    *E03D 5/092*     (2006.01)
    *G01V 8/12*     (2006.01)

(52) U.S. Cl.
    CPC ............. *E03D 5/105* (2013.01); *E03D 5/092* (2013.01); *G01V 8/12* (2013.01)

(58) Field of Classification Search
    CPC .......... E03D 5/105; E03D 5/092; G01V 8/12; E03C 1/04; E03C 2001/026; E03C 1/0404; G05D 7/0635; G05D 23/1917
    See application file for complete search history.

(56) References Cited

U.S. PATENT DOCUMENTS

| | | | |
|---|---|---|---|
| 2001/0024272 A1* | 9/2001 | Luetjens | G01N 21/9506 356/237.2 |
| 2004/0084609 A1* | 5/2004 | Bailey | G01S 17/026 250/221 |
| 2012/0212344 A1* | 8/2012 | Forsberg | G08B 3/10 340/573.1 |

* cited by examiner

*Primary Examiner* — Marina Tietjen
(74) *Attorney, Agent, or Firm* — Foley & Lardner LLP

(57) ABSTRACT

A flush actuator for engaging a flush valve. The flush actuator provides a mechanism assembly for automatically flushing the flush valve. A sensor provides a presence detection to trigger the automatic flushing. Redundant manual activation is provided.

20 Claims, 24 Drawing Sheets

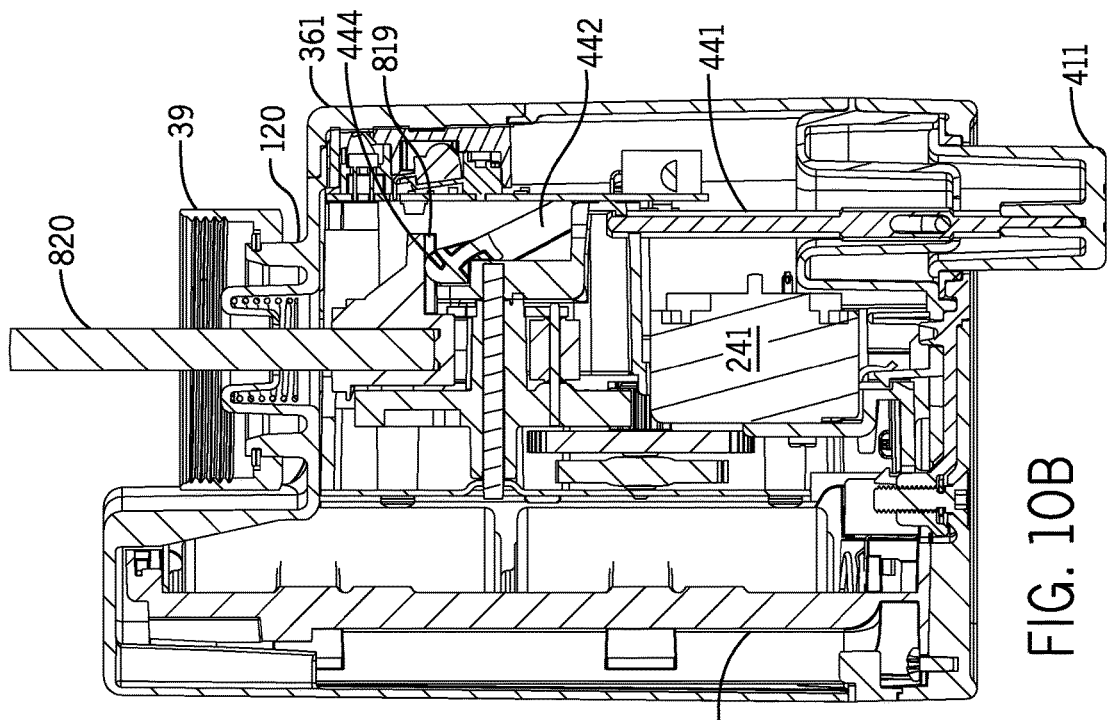
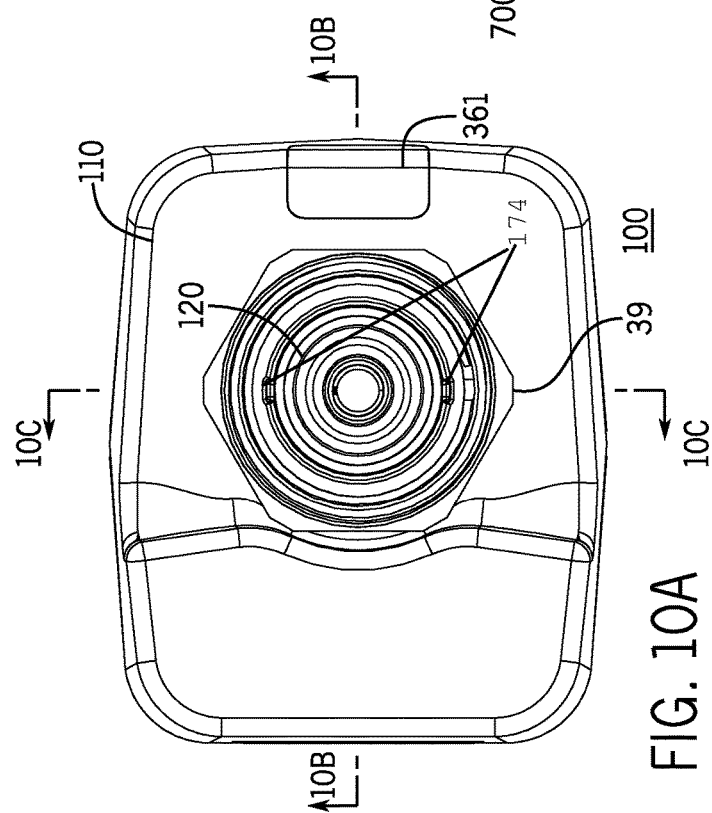

FLUSH ACTUATOR

CROSS REFERENCE TO RELATED APPLICATIONS

This application is a divisional of U.S. patent application Ser. No. 14/209,618 filed Mar. 13, 2014, which claims priority benefit of U.S. Provisional Application No. 61/788,733 filed Mar. 15, 2013, reference of which is hereby made in their entirety.

FIELD OF THE INVENTION

The present invention generally relates to flush valve actuators.

BACKGROUND OF THE INVENTION

Flush valves are well known in the art. Although many different types of flush valves are known, two types of flush valves that are commonly used rely upon an auxiliary valve to relieve a pressure chamber to allow the main valve to open for a flush. For example, see U.S. Pat. Nos. 5,881,993, 6,913,239 and 7,980,528 incorporated herein by reference. In order to initiate a flush cycle, that is, to flush the fixture, the auxiliary valve must be unseated. Typically this is accomplished by the use of a gland that extends from an auxiliary valve member. Engaging the gland, such as by striking the side of the gland, will tilt the auxiliary valve member off of the valve seat. As the flush cycle proceeds, the auxiliary valve member reseats allowing the pressure chamber to repressurize causing the main valve to close. Although typical flush valves have been designed to provide a single flush volume, dual mode flush valves have become increasingly important as a way to conserve water. Dual mode flush valves provide the user the ability to select between a higher volume flush and a lower volume flush.

In general, two types of actuation mechanisms are known in the art: manual and automatic. Manual actuation is accomplished through a user initiated process, traditionally by interaction with a mechanical handle. Automatic actuation is accomplished through the use of sensors to determine when a user is present and to actuate the flush valve without the need for direct user initiation, for example when the user has completed usage of the fixture.

There is a need to combine the water conservation of a dual mode flush valve with the reliability of a manual actuation and the ease of use and hygiene of automatic actuation.

SUMMARY OF THE INVENTION

One implementation of the invention relates to an automatic actuation assembly for a flush valve. An actuator assembly housing is provided with a mechanism assembly disposed therein. The actuator assembly housing has a receptacle for engaging with a flush valve, the receptacle comprising an outer ring disposed about a receptacle plunger passage. A retention flange is engageable with the receptacle. The flush valve further includes a plunger having a plunger head at an outer end and a shank extending there from to an inner end, the plunger head disposed within the housing and the plunger shank axially slidable in the receptacle plunger passage.

Another implementation of the invention relates to an automatic actuation assembly for a flush valve. An actuator assembly housing includes a sensor aperture. A sensor assembly is positioned adjacent the sensor aperture and has a first angled emitter and a second angled emitter and an angled receiver sensor. The first angled emitter and the second angled emitter are non-parallel and non-perpendicular to a vertical longitudinal plane of the actuator assembly housing. The sensor and at least one emitter are at an angle with respect to each other, the sensor receiver is positioned to not receive rays emitted by the at least one emitter that are specularly reflected.

Another implementation of the invention relates to an automatic flush actuation assembly comprising an actuator assembly housing and a mechanism assembly disposable therein. The housing has a housing plunger passage. The actuation assembly further comprises a plunger having a plunger head at an outer end and a shank extending there from to an inner end, the plunger head disposed within the housing and the plunger shank axially slidable disposed in the housing plunger passage. The mechanism assembly includes a mechanism frame supporting a gear train assembly. The gear train assembly includes a motor coupled to at least one gear and a roller system. The roller system includes a support gear and one or more rollers positioned a distance from the center of the support gear rotatable cam. The roller system is positioned adjacent the plunger for engagement of the plunger head. The actuation assembly further comprises a manual actuation assembly at least partially disposed within the actuator assembly housing, the manual actuation assembly including a face plate having a button coupled to a manual actuation arm, the manual actuation arm positioned adjacent the plunger and engageable with the plunger when the button is depressed.

Another implementation of the invention relates to a flush valve assembly comprising a valve body having a diaphragm assembly disposed therein with a stem extended therefrom. An actuator assembly housing is provided with a mechanism assembly disposable therein. The actuator assembly housing has a receptacle for engaging with the valve body, the receptacle comprising an outer ring disposed about a receptacle plunger passage. A retention flange engageable with the receptacle and a nut retained between the retention flange and the actuator assembly housing, the nut engageable with a handle boss of the valve body. A plunger is included having a plunger head at an outer end and a shank extending there from to an inner end, the plunger head disposed within the housing and the plunger shank axially slidable in the receptacle plunger passage. A bushing is at least partially disposed in the handle boss, the bushing having a bushing plunger passage for slidably receiving the plunger. The mechanism assembly includes a mechanism frame supporting a gear train assembly and a roller system including one or more rollers adjacent the plunger head. A manual actuation assembly is at least partially disposed within the actuator assembly housing, the manual actuation assembly including a face plate having a button coupled to a manual actuation arm, the manual actuation arm positioned adjacent the plunger and engageable with the plunger when the button is depressed. The plunger is engageable with the valve gland by rotation of the rollers to engage the plunger head for lateral movement of the plunger or actuation of the manual actuation arm to engage the plunger head for lateral movement.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 10A is a proximate end view of a side mount actuator assembly;

FIG. 10B is a horizontal cross-sectional along line 10B-10B of FIG. 10A.

FIG. 11 is a vertical cross-section of a side mount actuator assembly affixed to a valve body with a bushing disposed there between.

FIG. 15A illustrates an exploded view of the sensor unit.

DETAILED DESCRIPTION OF THE PREFERRED EMBODIMENTS

Figure 1A:
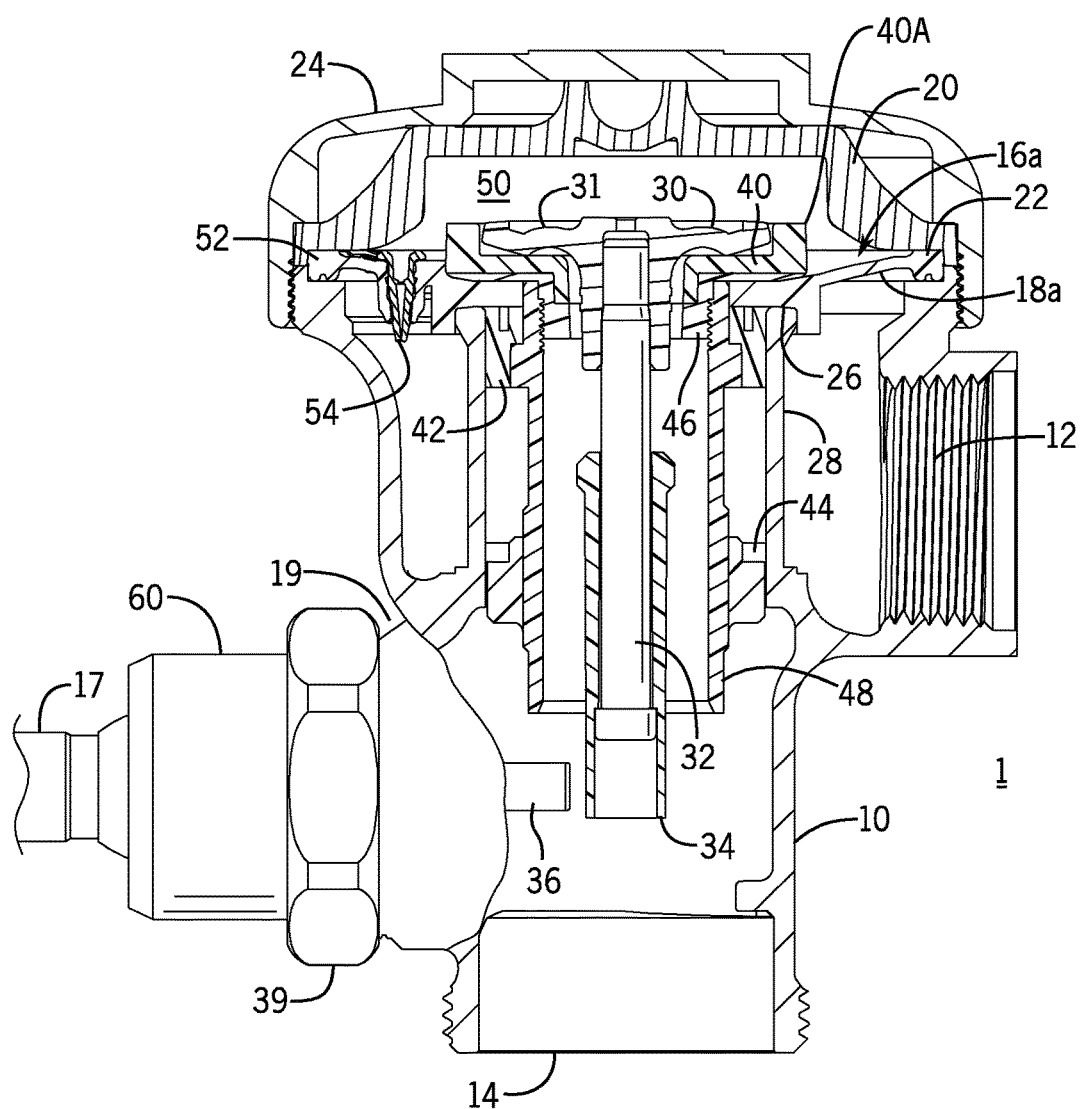
FIG. 1A is a partial section through a diaphragm valve body.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Figure 1B:
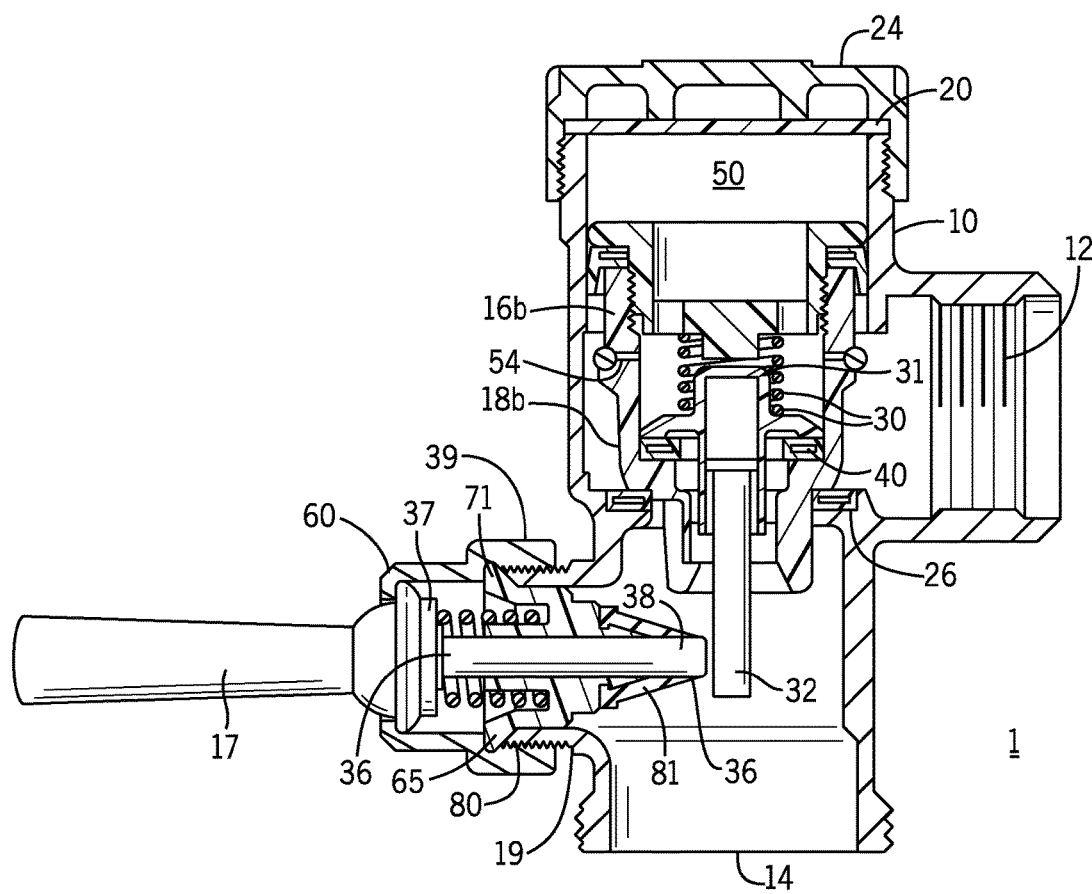
FIG. 1B is a section through a piston valve body.

A flush valve of, or for use with certain embodiments of the present invention may be of a known type, such as, but not limited to a diaphragm valve as generally described in U.S. Pat. No. 7,980,528 incorporated herein by reference, or a piston valve as generally described in U.S. Pat. No. 5,881,993 or U.S. Pat. No. 6,913,239 incorporated herein by reference. With reference to FIGS. 1A and 1B, the flush valve 1 includes a valve body 10 having an inlet 12 and an outlet 14 and a main valve 16a (FIG. 1A), 16b (FIG. 1B) disposed there between for controlling the flow of water through the flushometer. When installed the inlet 12 is connected to a water supply [not shown] and the outlet 14 is connected to a fixture 5 (FIG. 12A) such as a toilet. The valve body 10 also typically includes a handle opening 15.

The main valve 16 (typically a diaphragm assembly 16a (FIG. 1A) or a piston assembly 16b (FIG. 1B)) comprises a valve seat 26 formed at an upper end of a barrel 28 and a valve member 18 (e.g., diaphragm 18a or piston 18b). With continued reference to FIG. 1A, the barrel 28 forms a fluid conduit connecting the valve seat 26 with outlet 14. A pressure chamber 50 is provided within the valve body 10, above the main valve seat 26. The pressure chamber 50 is pressurized by the line pressure from the inlet 12 and retains the valve member 18, such as a diaphragm 18a or piston 18b, against the main valve seat 26. An auxiliary or relief valve 30, having an auxiliary valve head 31 and auxiliary valve seat 40, is provided between the pressure chamber 50 and the outlet 14 to controllably seal the pressure chamber 50. Opening of the auxiliary valve 30 vents the pressure chamber 50 due to the relatively higher pressure in the pressure chamber 50 compared to the outlet 14. A bottom surface of the valve member 18 is exposed to the inlet 12, which is pressurized, and, when the pressure chamber 50 is vented, the pressurized inlet water causes the main valve 16 to open, allowing flow of water from the inlet 12 to the outlet 14 over the main valve seat 26. By-pass valves 54 place the pressure chamber 50 in communication with the inlet 12, allowing repressurization of the pressure chamber 50 when the auxiliary valve 30 closes. The repressurization of the pressure chamber 50 reseats the main valve 16, ending the flush cycle.

With reference to FIG. 1A, the auxiliary valve 30 typically includes a valve stem 32 that extends below the main valve seat 26 and is adjacent the handle opening 15 in the valve body 10. The valve stem 32 may include a telescopically carrying movable gland 34. It should be appreciated that the gland 34 allows the auxiliary valve 30 to close even where the flush valve is still being actuated (for example, a manual handle 17 being depressed). The valve stem 32, or specifically, gland 34, is positioned for contact by a plunger 36. The plunger 36 (see FIG. 1B) includes a plunger head 37 and a plunger shank 38 extending there from. The plunger head 37 generally has a larger perimeter than the plunger shank 38. The plunger shank 38 opposite the plunger head 37 is configured to engage the valve stem 32. The plunger 36 is slidably positioned in a bushing 65, which is typically disposed within the handle opening 15 of the valve body 10. Actuation of the plunger 36 imparts lateral movement to the plunger 36 to slide in the bushing 65 and engage the valve stem 32. The auxiliary valve 30 is opened by engaging the valve stem 32 to tilt an auxiliary valve member 31, typically a disk, off the auxiliary valve seat, 40.

A typical mechanism for actuating the plunger 36 is the manual handle 17, shown in FIGS. 1A and 1B. The handle 17 may be retained on the valve body 10 by a nut 39, such as the embodiment illustrated in FIG. 1A wherein the nut 39 captures a handle socket 60 that retains a portion of the handle 17 and the plunger 36. Alternatively, the socket 60 and nut 39 may be a single component as illustrated in FIG. 1B.

For diaphragm assembly valves, an embodiment of which is shown in FIG. 1A, the valve member 18 includes a diaphragm 18a peripherally held to the valve body 10 by an inner cover 20. The diaphragm 18a is seated upon a shoulder 22 at the upper end of valve body 10. The inner cover 20 may secure a peripheral edge 52 of the diaphragm 18a in this position. An outer cover 24 is affixable to the body, such as by threading, to hold the inner cover 20 in position. The diaphragm assembly 16a, in addition to diaphragm 18a and the auxiliary valve 30, may include a retaining disk 40, a refill ring 42 and a flow control ring 44. The underside of the retaining disk 40 is attached to a collar 46, which in turn is attached at its exterior to a guide 48 which carries the refill ring 42. The above described assembly of elements firmly holds the diaphragm 18a between the upper face of the refill ring 42 and a lower facing surface of the collar 46. Above the diaphragm assembly 16a is a pressure chamber 50 which maintains the diaphragm assembly 16a in a closed position when the flush valve 1 is not in use.

As is known in the art, when the handle 17 is operated, the plunger 36 will contact gland 34, tilting the auxiliary valve 30 off its seat on the retaining disk 40. This will permit the discharge of water within the pressure chamber 50 down through the guide 48. Inlet pressure will then cause the diaphragm 18a to move upwardly off the main valve seat 26, permitting direct communication between the inlet 12 and the outlet 14 through the space between the bottom of the diaphragm assembly 16a and the main valve seat 26. The raising of the diaphragm 18a also lifts the auxiliary valve gland 34, allowing it to clear the plunger 36 even if the user has held the handle 17 in an actuated position. Once the gland 34 clears the plunger 36 the auxiliary valve 30 reseats on the auxiliary valve seat 40, such as the diaphragm 18a seating on the retaining disk 40a. As soon as this operation has taken place, the pressure chamber 50 will begin to fill through the by-pass valves 54 in the diaphragm assembly 16a. As flow continues into the pressure chamber 50, the diaphragm 18a will move back down toward the main valve seat 26 and when it has reached that position, the flush valve 1 will be closed.

Piston assemblies work in a generally similar manner but having a piston rather than a diaphragm for sealing the main valve 16. One embodiment of a piston assembly is illustrated in FIG. 1B. The main valve 16 is a piston assembly 16b and the main valve member 18 is a piston 18b. The actuation mechanism engages the plunger 36, which contacts the valve stem 32 of the auxiliary valve 30. This allows the pressure chamber 50 to evacuate and the piston 18b to unseat from the main valve seat 26, opening the flush valve 1.

Side Mount Actuator Assembly

Figure 2:
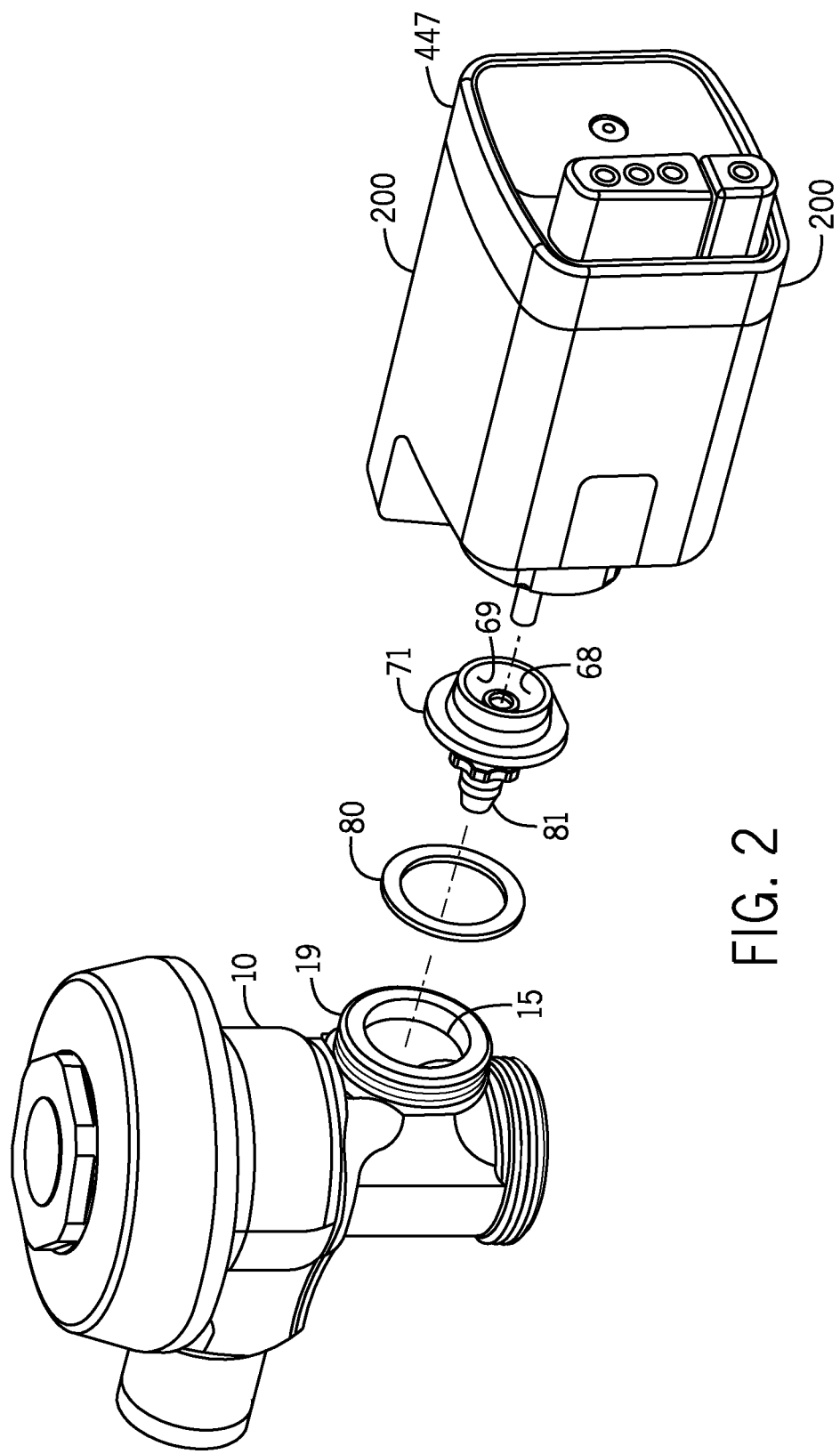
FIG. 2 is an exploded perspective view of a side mount actuator assembly, a dual mode bushing, and the valve body.
Figure 3A:
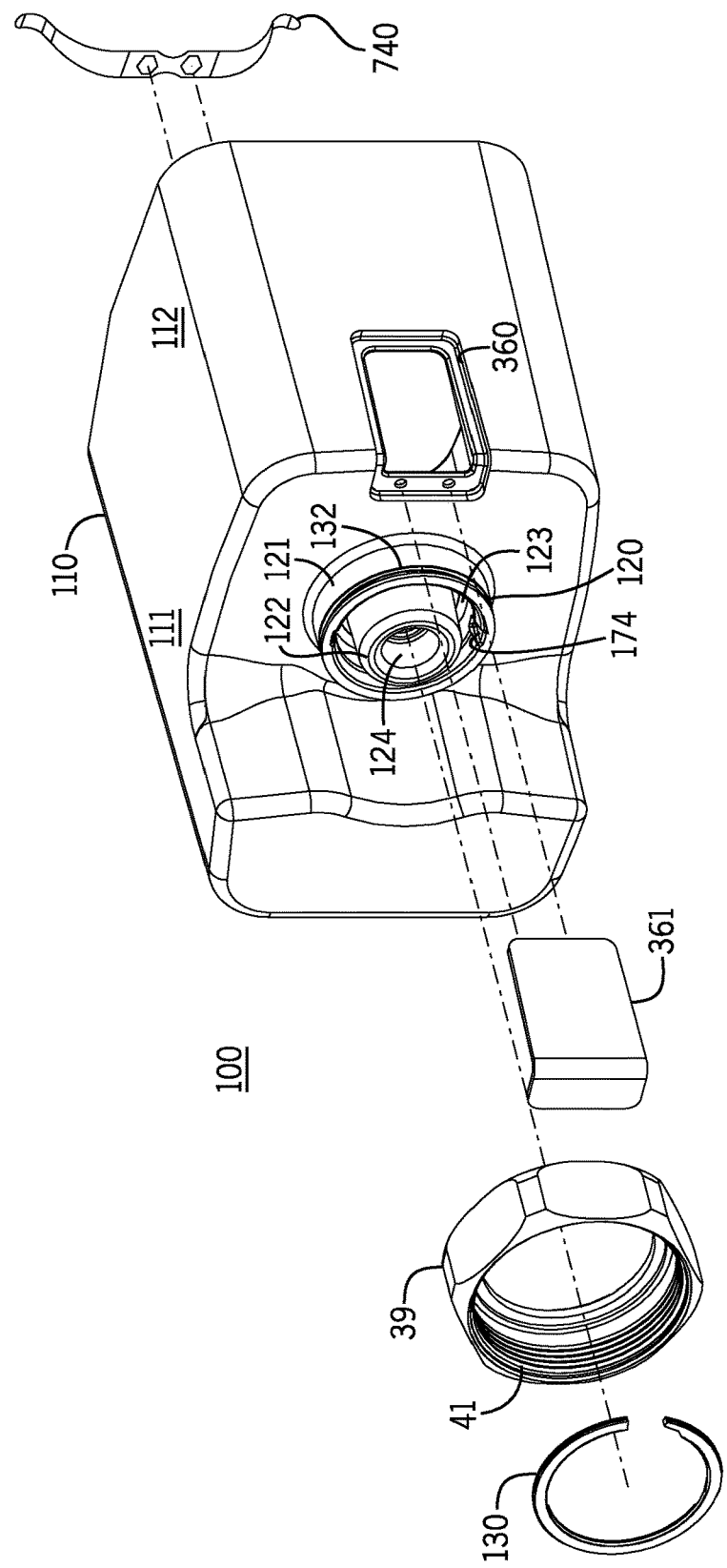
FIG. 3A is a left side (proximate the valve body) perspective view of a side mount actuator assembly with the retention flange and nut shown in exploded perspective.
Figure 3B:
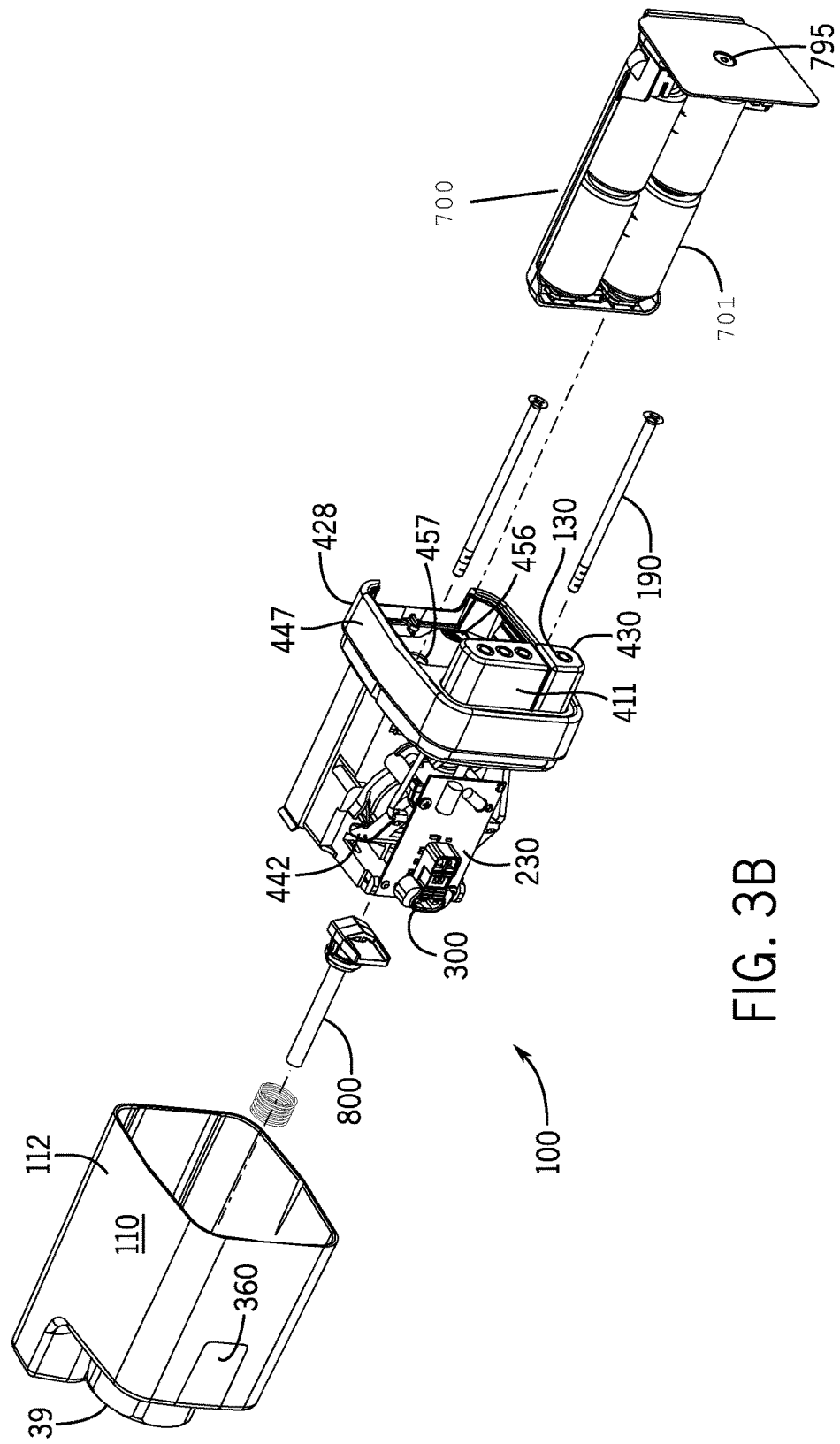
FIG. 3B is a right side (distal the valve body) perspective view of a side mount actuator assembly with the actuating assembly housing, plunger, mechanism assembly, and battery assembly shown in exploded perspective.

In one embodiment, a side mount actuator assembly 100 is provided for removable connection to the valve body 10. FIGS. 2, 3A, and 3B illustrate an embodiment wherein the side mount actuator assembly 100 includes an actuator assembly housing 110 configured to removably connect to the valve body 10 and having disposed therein a mechanism assembly 200. In one embodiment, the actuator assembly housing 110 serves to support and contain one or more of an automated actuation assembly 220 (FIG. 4C) and a manual actuation assembly 400 (FIG. 4D). In one embodiment, the actuator assembly housing 110 engages directly with the valve body 10 of a flush valve mounting to the side of the valve body 10 at the handle opening 15.

The actuator assembly 100 includes a proximate portion 111 that is generally proximate the flush valve 1 when the actuator assembly 100 is attached to a valve body 10. The actuator assembly 100 further includes a distal portion 112 general opposite the proximate portion 111. It should be appreciated that the proximate portion 111 and the distal portion 112 may be understood to refer to general areas of the actuator assembly 100. In one embodiment, the structures described in greater detail herein are positioned on or within the actuator assembly housing 110 such that the actuator assembly 100 is ambidextrous with regard to the mounting side of the valve body 10, allowing for "left hand" or "right hand" installations.

In one implementation, the bushing 65 and/or the receptacle 120 may include a bushing alignment feature 173, such as corresponding features, to allow for alignment of the bushing 65, for example a dual flush bushing 66 as described herein, within the receptacle 120. That is, the dual mode bushing 66 and the receptacle 120 are "keyed" to ensure proper alignment of the dual mode feature of the bushing 66. One embodiment includes an alignment groove 174 on an interior portion of the outer ring 121 for engaging a protrusion 173 of the dual mode bushing 66. It should be appreciated that the protrusion 173 may be utilized with a dual mode bushing 66 as described further herein to allow orientation of the bushing 72 in relation to the actuator assembly 100 and valve body 10 to effectuation the desired dual mode flush volumes. The corresponding features may include a protrusion [not shown] on the receptacle 120 and a groove [not shown] on the bushing; 66 or such similar arrangements.

Connection Mechanism

The actuator assembly 100 is removably connectable with the valve body 10. In one embodiment, best shown in FIGS.

2, 3A, 10A-C, and 11, a receptacle 120 extends from the proximate portion 111 of the housing 110 for engaging with the valve body 10. The receptacle 120 includes an outer ring 121 (FIG. 3A) that extends from the housing 110. The receptacle 120 has a receptacle plunger passage 124 (FIG. 3A) that is configured to allow a portion of the plunger 36 to pass through the housing 110.

In one implementation, the outer ring 121 further includes a receptacle 120 retention flange 130, which may be a raised portion, for example having a larger outer diameter than the adjacent outer ring 121. The retention flange 130 may be a separate component removable, preferably selectively removable via a tool, from the receptacle 120 such as a retaining ring. The retention flange 130 may serve to secure the nut 39 to the outer ring 121, and thus to the actuator assembly 100. In one embodiment, the outer ring 121 includes an outer ring groove 132 circumscribing the outer ring 121. The retention flange 130 may be a component removable from the outer ring 121 and that is engageable with the outer ring 121 by being partially seated within the outer ring groove 132. The retention flange 130 may be, but is not limited to, a rigid, such as metal, ring or clip, or a elastic gasket or such, for example having a barbed shape for allowing passage of the nut 39 in one direction but retaining the nut 39 against removal in the other direction.

In one embodiment, the nut 39 is disposable on the receptacle 120, captured between the housing 110 and the retention flange 130 to retain the nut 39 on the actuator assembly 100. In one embodiment, the nut 39 includes a threaded interior surface 41 that is engageable with a threaded handle boss 19 on the outer surface of the handle opening 15. Engaging the nut 39 to the handle boss 19 secures the actuator assembly 100 to the valve body 10. In one embodiment best illustrated in FIG. 11, when assembled, as the nut 39 is threaded onto the handle boss 19, the nut 39 moves toward the retention flange 130, on the receptacle 120, as the receptacle 120 engages the dual mode bushing 66 and secures the dual mode bushing 66 between the end of the receptacle 120 (and the entire actuator assembly 100) and the edge of the handle boss 19.

Figure 11:
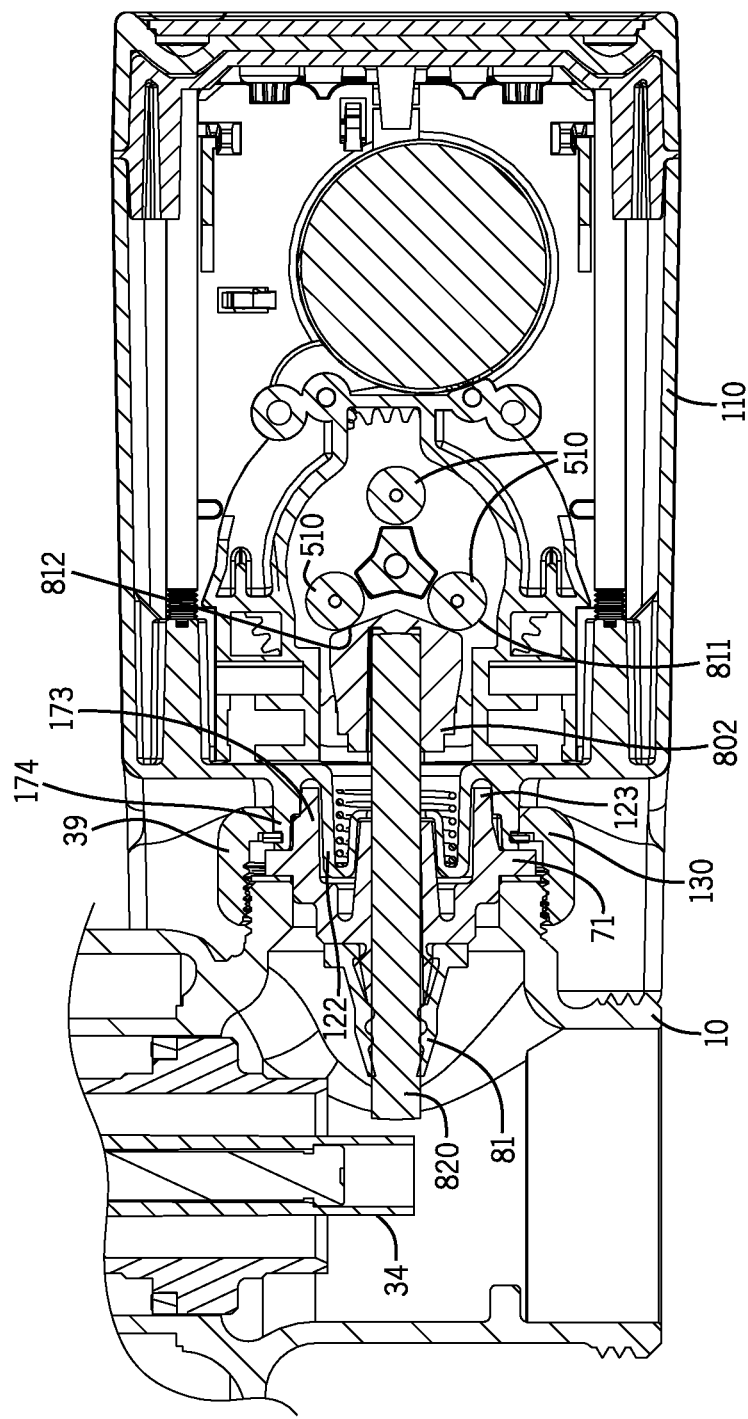

In certain embodiments, the receptacle 120 is configured to engage with the dual mode bushing 66 and the valve body 10. FIG. 11 illustrates a cross-section view of one embodiment of a valve body 10, dual mode bushing 66, and actuator assembly 100 assembled with the actuator assembly 100 retained on the valve body 10 and the plunger shank 38 extending from the actuator assembly 100 through the dual mode bushing 66 to adjacent the gland 34. Specifically, in one embodiment, the dual mode bushing 66 is at least partially disposed within the handle opening 15 of the valve body 10 and the receptacle 120 engages one or more of the dual mode bushing 66 or the valve body 10. In the embodiment illustrated in FIG. 3A, the receptacle 120 comprises an outer ring 121 and an inner ring 122 circumscribed by the outer ring 121 with a receptacle annular gap 123 there between for receiving the skirt 70 of the dual mode bushing 66. The receptacle plunger passage 124 is provided in the inner ring 122. The bushing 65, such as illustrated with respect to a dual mode bushing 66 in FIGS. 9A-9B, may include an outer skirt 70 having an annular flange 71 and a bushing central sleeve 68 defining a bushing plunger passage 67, with a bushing annular gap 69 there between. In such embodiments, the bushing 65 and receptacle 120 form a "nesting" arrangement. It should be appreciated that this arrangement aids in stabilizing and securing the connection of the actuator assembly 100 to the valve body 10. The actuator assembly 100 and the dual mode bushing 66/valve body 10, in one embodiment, engage in more than a single plane.

In one implementation, when the actuator assembly 100 is affixed to a valve body 10 with dual mode bushing 66, the bushing outer skirt 70 is partially disposed within the receptacle annular gap 123 between the outer ring 121 and inner ring 122. The receptacle inner ring 122 is partially disposed within the bushing annular gap 69 between the bushing outer skirt 70 and the bushing central sleeve 68. The bushing plunger passage 67 and the receptacle plunger passage 124 substantially align such that the plunger is slidably and tiltably disposed within the dual mode bushing 66 and actuator assembly 100. The receptacle plunger passage 124 and the dual mode bushing 66 align to allow the plunger shank 38 to pass there through. In one embodiment, the plunger 36 has a longer shank 38 than typical prior art manual actuation devices to accommodate the distance from the valve stem 32 to the interior of the actuator assembly housing 110 where the plunger head 37 must be disposed.

Mechanism Assembly

The mechanism assembly 200 is disposable within the housing 110. The mechanism assembly 200 includes the mechanism for actuating the plunger 36. In one embodiment illustrated in FIG. 3B, the mechanism assembly 200 is removable from the distal portion 112 of the housing 110, such as where the housing 110 includes an open side for accommodating the mechanism assembly 200. The mechanism assembly may be fixed to the housing 110 via fasteners 190, such as screws or bolts. A portion of the mechanism assembly 200 may form an exterior surface 447 of the actuator assembly 100 as illustrated in FIG. 2.

Automated Actuation Assembly

One embodiment of the mechanism assembly 200 includes an automated actuation assembly 220. FIGS. 4A-D illustrate an embodiment of the mechanism assembly 200. An automated actuation assembly 220 includes a mechanism assembly frame 221 for supporting the structures of the automated actuation assembly 220. The automated actuation assembly 220 further includes a printed circuit board (PCB) 230 for interconnecting various electronic components. The electronic components may include a sensor unit 300 and a motor and gear train assembly 240. The PCB 230 may be supported by PCB supports 231 elevating the PCB 230 above the motor and gear train assembly 240. The sensor unit 300 may be placed on the PCB 230 such that the sensor unit 300 is positioned to correspond with a sensor aperture 360 in the housing 110.

Figure 4A:
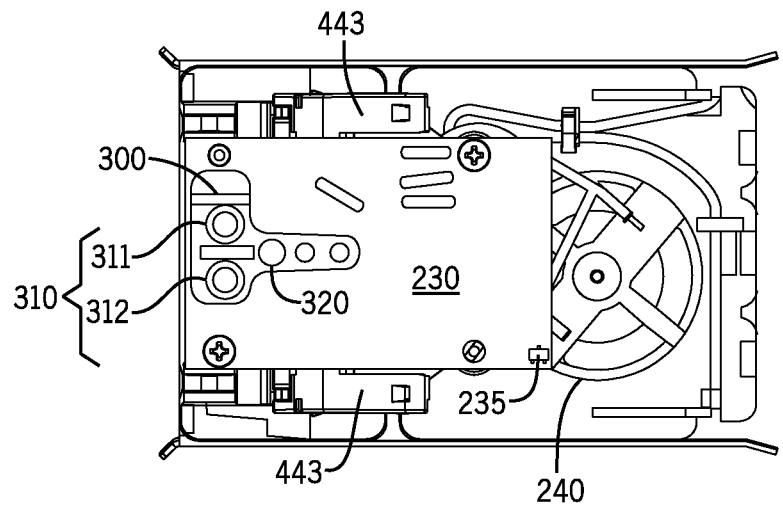
FIG. 4A is a top view of a mechanism assembly.
Figure 4B:
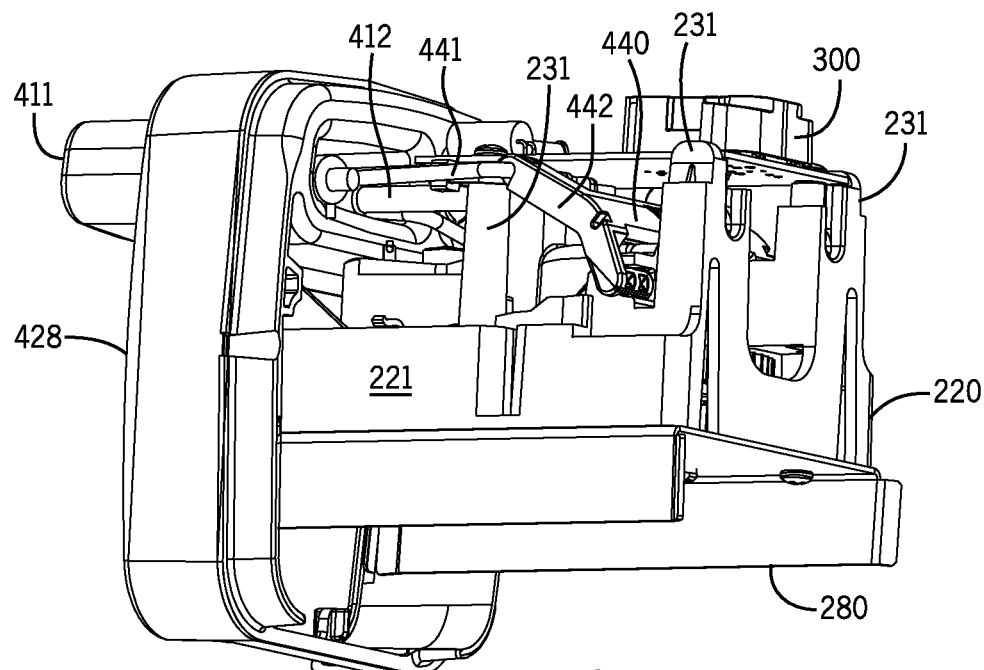
FIG. 4B is a proximate perspective view of a mechanism assembly.
Figure 4C:
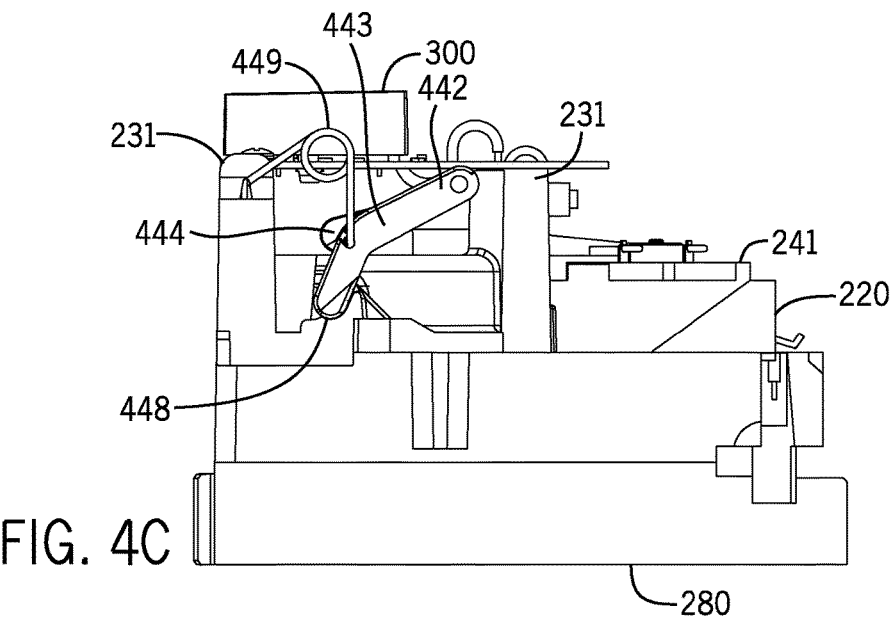
FIG. 4C is a side view of a mechanism assembly.
Figure 4D:
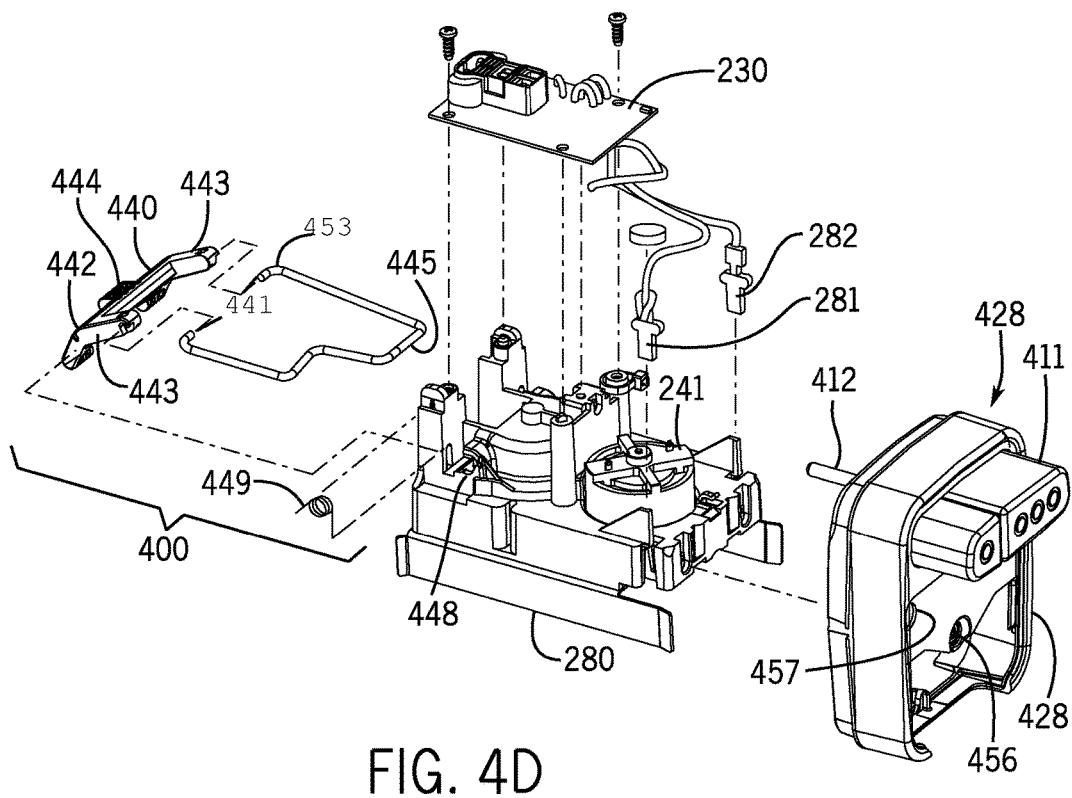
FIG. 4D is an exploded distal perspective view of a mechanism assembly.
Figure 4E:
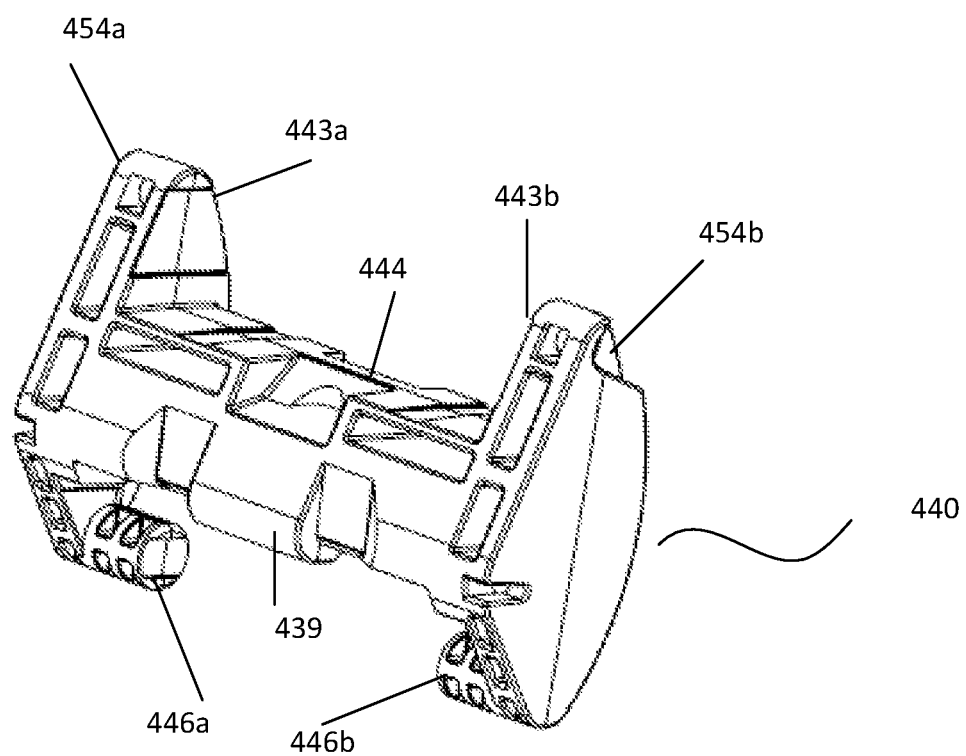
FIG. 4E illustrates an implementation of an second arm of the mechanism assembly.
Figure 5A:
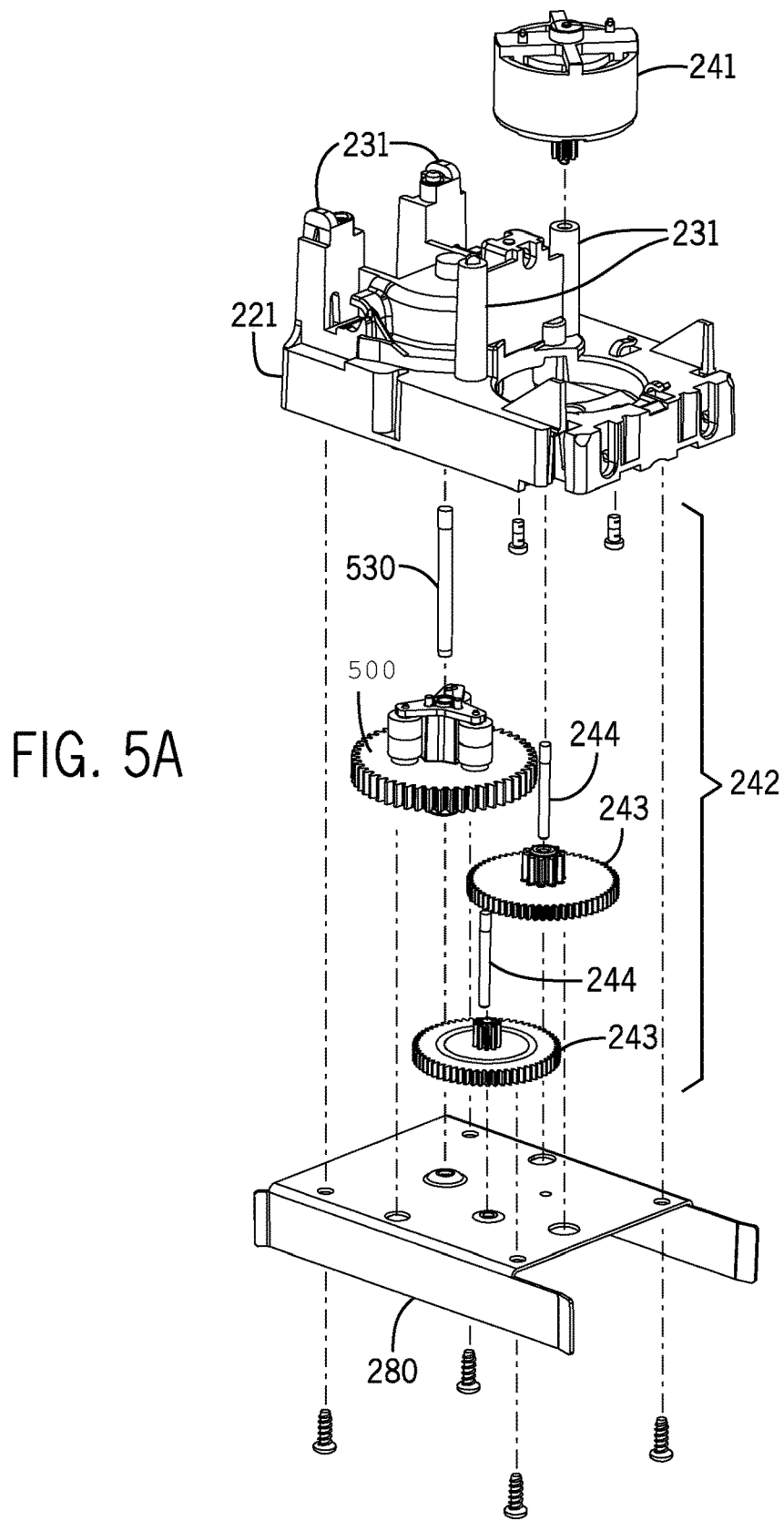
FIG. 5A is an exploded view of the motor gear train assembly, the mechanism assembly frame, and the support plate.

In one embodiment, the motive force for the automated actuation assembly 220 is provided by a motor 241 as part of the motor and gear train assembly 240, which is shown in FIGS. 4A, 4C and 4D and in greater detail in FIG. 5A. In one implementation, the motor 241 converts electrical energy to rotational energy. The motor 241 is coupled to a gear train 242 comprising of one or more gears 243 for translating the rotational energy of the motor 241 to one or more rollers 510. The one or more gears 243 may be secured by a corresponding pin 244, which itself may be secured to the frame 221 or the support plate 280. Rotation of the motor 241, such as a traditional small electric motor spinning a drive shaft, rotates a gear 243 in the gear train 242. The gear train 242 interacts with the plunger 36 to convert the rotation motion of the motor 241 into linear motion of the plunger 36 to engage the valve stem 32.

Sensor Unit

Figure 13:
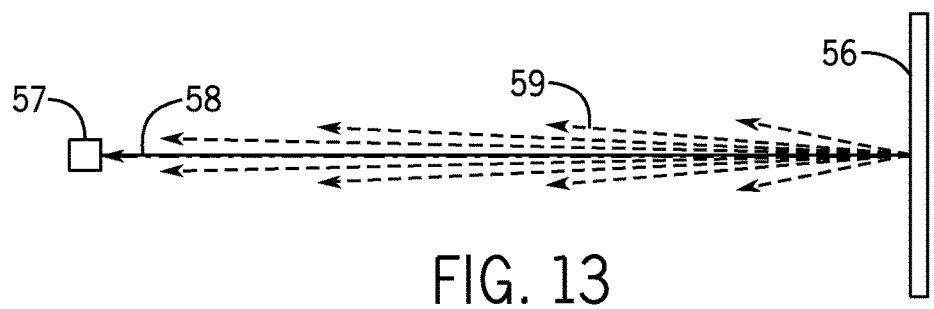
FIG. 13 illustrates a typical perpendicular emitted beam from a sensor unit to a highly reflective surface, such as a shiny door.

The sensor unit 300 may be included for embodiments utilizing an automatic actuation feature. The sensor unit 300 is configured to controllably engage the motor 241 to actuate the plunger. Because automatic flush valves are frequently placed in water closets, or the like, opposite a door, it has been observed that certain features of the door may cause poor performance of the sensor unit 300. FIG. 13 illustrates a typical sensor unit 57 that provides a perpendicular infrared (IR) beam 58 from the sensor unit 57 to a highly reflective surface, such as a highly reflective door 56. As can be seen, the door 56 tends to specularly reflect the IR beam 58 back. Because of the proximity of the emitter and the sensor within the sensor unit 57, the reflected IR (in particular, the major rays) that is sensed by the sensor unit 57 travels through nearly the same space as the emitted beam.

FIG. 13 illustrates a problem with prior art sensor unit 57, a false detection due to the presence of the door 56 and the position of the sensor unit 57. The emitted beam 58 is reflected by the door 56 and can cause the sensor unit 57 to provide a false indication of a user being presence or, if calibrated to account for the strong reflection from the door 56, can be too insensitive to detect the relatively weaker reflection from a user.

In one embodiment, the actuator assembly 100 includes the sensor unit 300. The sensor unit 300 may be in communication with other components of the actuator assembly 100 so as to enable automatic actuation of the flush valve upon the detection of a certain state, such as the presence and then absence of a user. One implementation of the sensor unit 300, an embodiment of which is illustrated in FIG. 4A, comprises an active sensor having an emitter 310 and a sensor receiver 320. The emitter 310 of the embodiment in FIG. 4A includes a first emitter 311 and a second emitter 312.

One embodiment, examples of which are illustrated in FIGS. 12A-D, the emitters 311, 312 are positioned at an angle with respect to the actuator assembly 100 and valve body 10, in one implementation at a compound angle of 2-15 degrees, preferably 5-11 degrees and more preferably 5-7 degrees in an alternative embodiment, most preferably 10 degrees from perpendicular to the normal line of the sensor unit 300 in the horizontal and 6-30 degrees, preferably 12-20 degrees, more preferably 12-15 degrees, and most preferably 15 degrees from perpendicular in the vertical. It should be understood that the position of the emitters 311, 312 is described with respect to their emitted beams rather than the physical emitter. The two emitters 311, 312 may be positioned such that their beams are angled in the opposite direction in the horizontal, the vertical, or both. The sensor receiver 320 is angled, 5-11 degrees from perpendicular in the horizontal. Thus, each of the emitters 311, 312 is at a non-transverse angle with respect to the handle axis. FIGS. 12A-D illustrate various views of the field of emission for one embodiment of the sensor unit 300. As can be seen in FIGS. 12A-D, the position of the emitters 311, 312 results in the sensor unit's output being nontransverse with respect to the handle 17. In one embodiment, the sensor unit 300 is positioned such that the emitters 311, 312 are angled, in the horizontal, towards a center line of the associated fixture, such as a toilet, to provide an emitter field roughly corresponding to where a user would be positioned at the center of the fixture. In one embodiment, the emitters 311, 312 beams are non-parallel and non-perpendicular to a vertical longitudinal plane. In one implementation, the emitters 311, 312 beams are also non-parallel and non-perpendicular with respect to each other, preferably such that they extend at opposite angles from the actuator assembly 100. In one implementation, the sensor receiver 320 and the at least one emitter 310 are at an angle respect to each other.

Figure 14A:
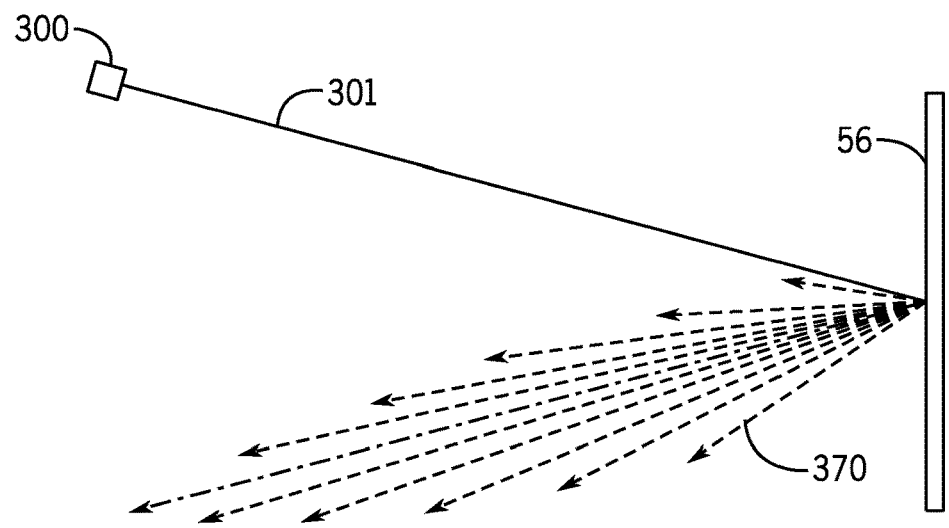
FIG. 14A illustrates an angled emitted beam from the sensor unit to a highly reflective surface, such as a shiny door and the reflection of same.
Figure 14B:
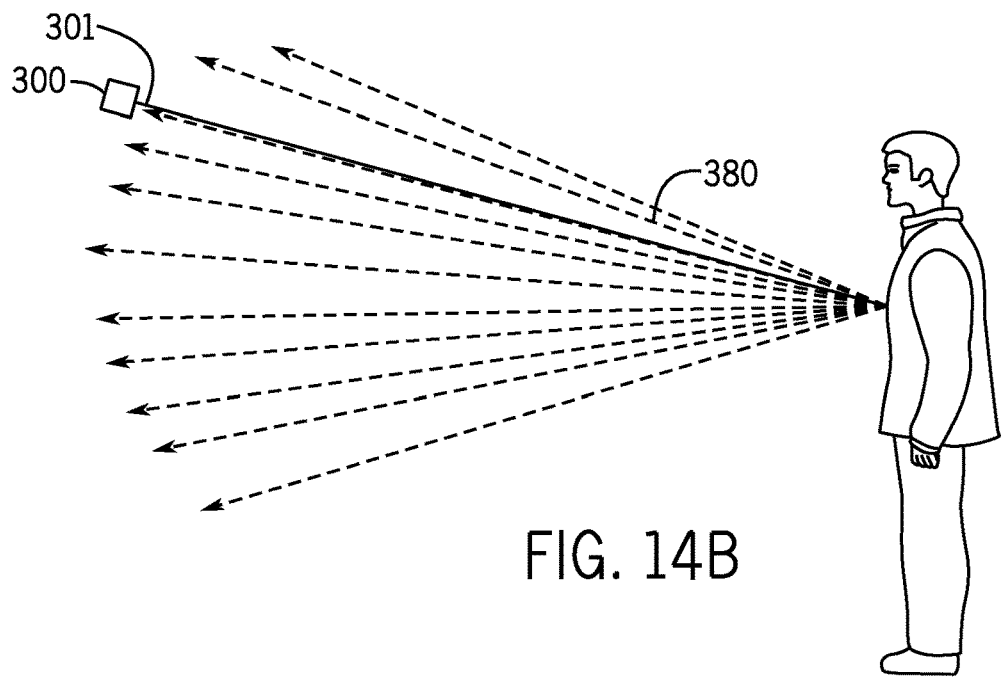
FIG. 14B illustrates an angled emitted beam from the sensor unit to a typical restroom fixture user wearing typical fabrics and the diffuse reflection of the same.

The position of the emitters 311 and 312 being angled with respect to the sensor unit 300, such as being mounted on angled spacers, and side mount actuator assembly 100 result in the specularly reflected rays from an object such as a door 56 being reflected away from the sensor receiver 320. FIG. 14A illustrates an embodiment of the sensor unit 300 having an angled emitter with an emitted beam 301 that is angled in the vertical with respect to the valve body 10. The major reflected rays 370 do not reflect back to the sensor receiver 320 and, thus, significantly reduce the chances of a false indication of a user. FIG. 14B illustrates the sensor unit 300 of FIG. 14A with a user present. The emitted beam 301 is reflected by the user in a much wider field due to the typically non-planar surface of the user and the specular reflecting materials worn by most users. At least a portion of the reflected rays 380 return to the sensor receiver 320, allowing for a detection of the user's presence.

Figure 12A:
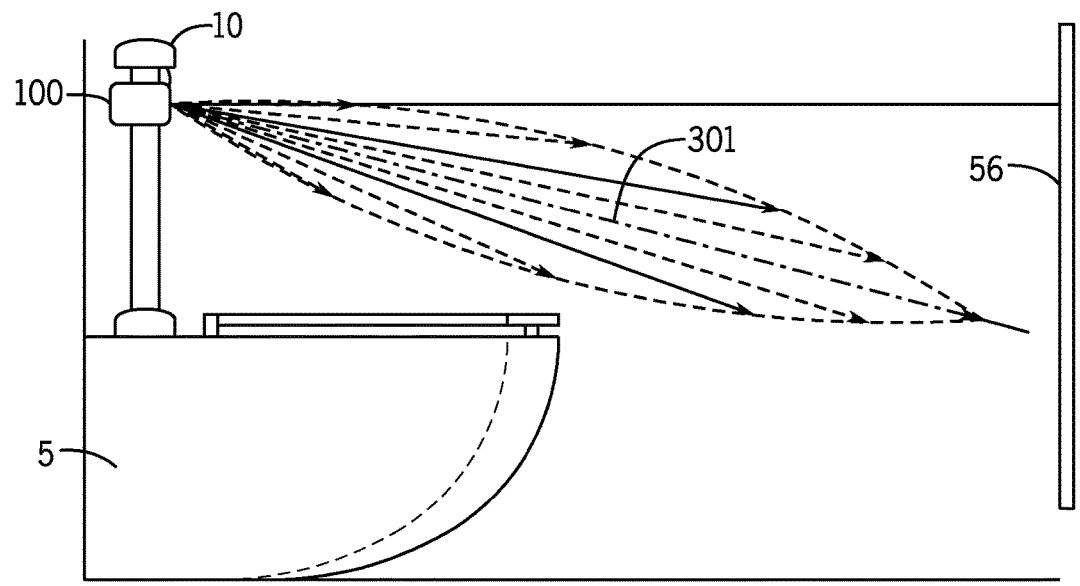
FIG. 12A is a side-view of a down-looking emitter for higher mounting installations.
Figure 12B:
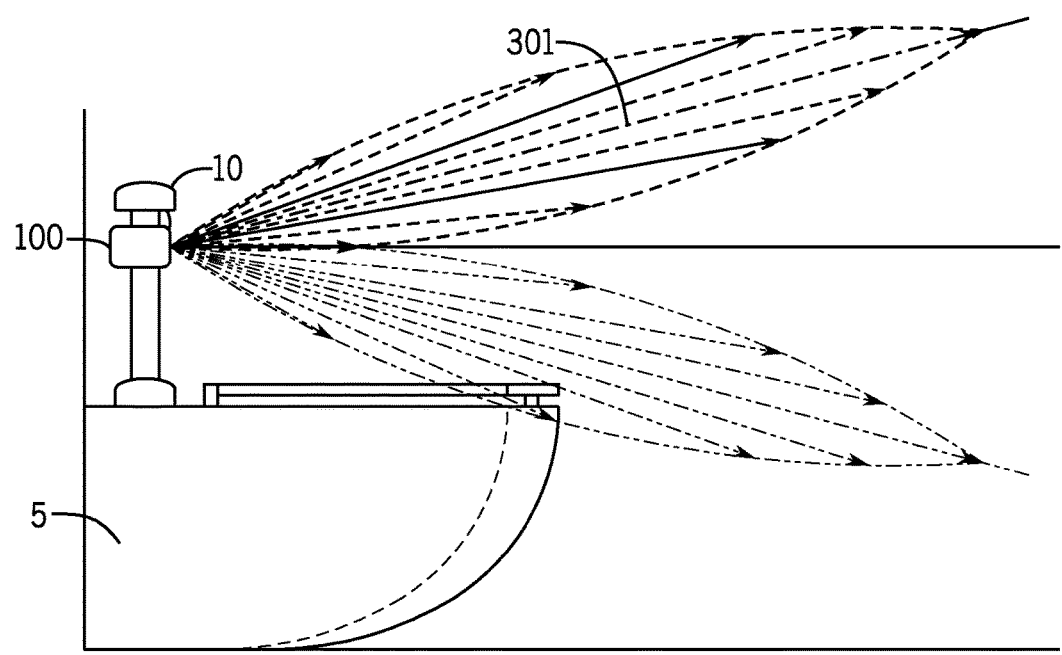
FIG. 12B is a side-view of an up-looking emitter for lower mounting installations.
Figure 12C:
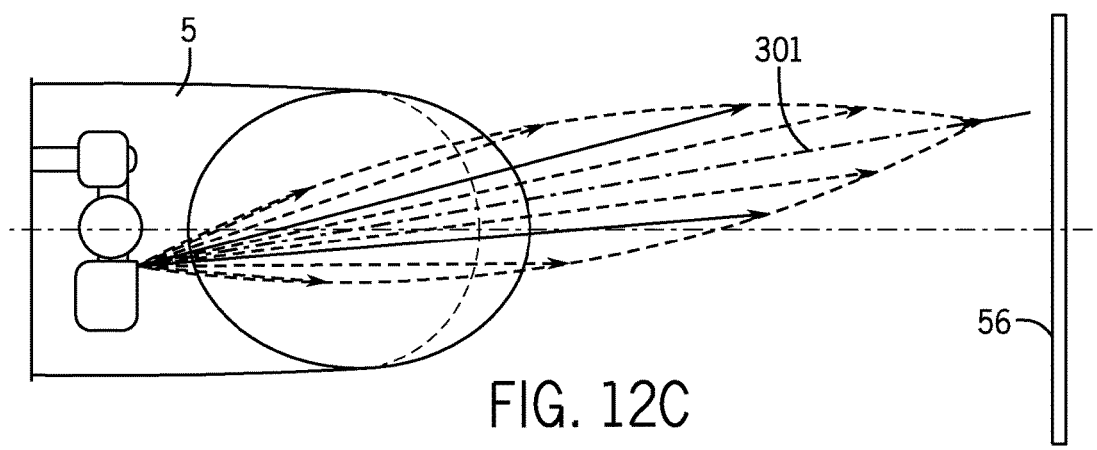
FIG. 12C is a top-view of the sensor unit for a right hand (facing the fixture) mounting.
Figure 12D:
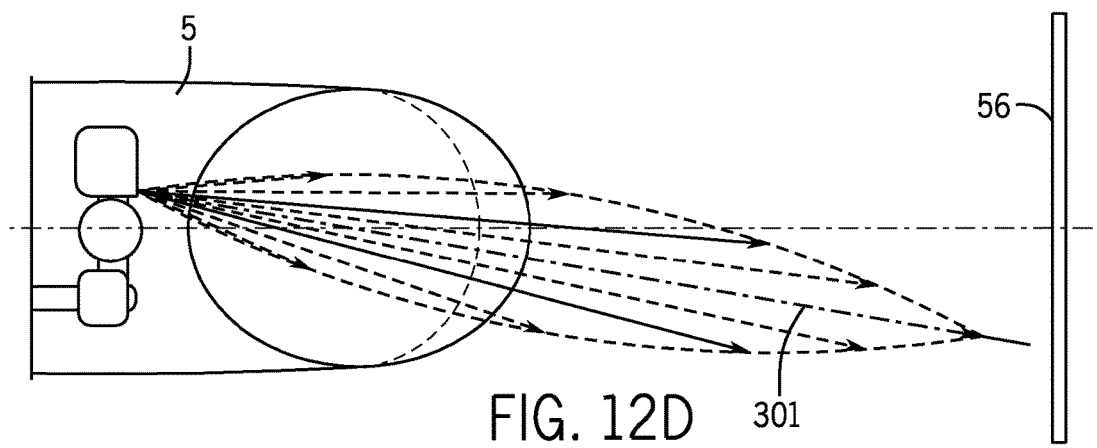
FIG. 12D is a top-view of the sensor unit for a left hand (facing the fixture) mounting.
Figure 12E:
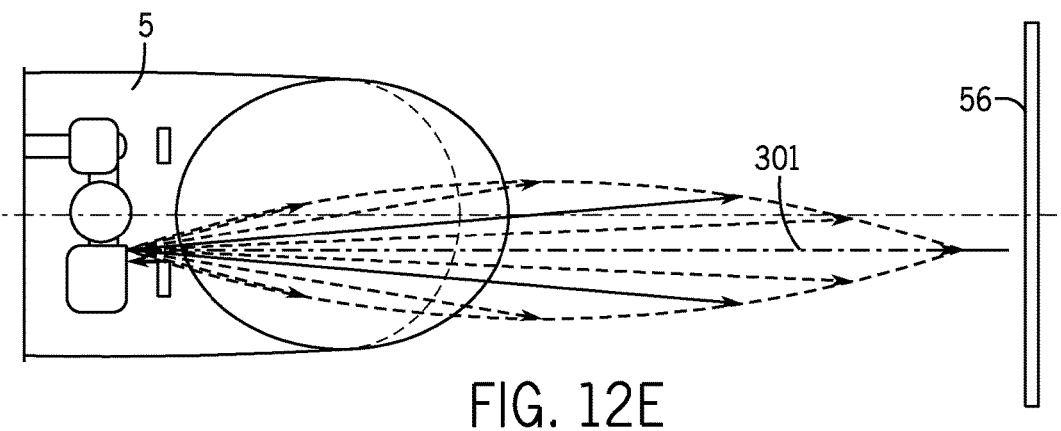
FIG. 12E illustrates a top-view of a typical perpendicular emitted beam from a sensor unit.

FIG. 12E illustrates the non-angled emitted beam in the horizontal that is reflected to the sensor by a top of a lifted toilet seat and causes a false indication of a user. FIGS. 12C and 12D illustrate an embodiment of the sensor unit 300 having an angled emitter with an emitted beam 301 that is angled in the horizontal with respect to the valve body 10. In the horizontal, the emitters 311, 312 are angled, towards a center line of the associated fixture 5, such as a toilet, not only to provide an emitter field roughly corresponding to where a user would be positioned at the center of the fixture, but also significantly to reduce the chances of a false indication of a user by the reflection from the lifted toilet seat because the angled beam passes through the top gap of toilet seat.

FIG. 12A is a down-looking emitter for higher mounting installations and for short users; FIG. 12B is a side-view of an up-looking emitter for lower mounting installations to avoid the reflection from the toilet bowl and seat.

FIGS. 3A and 3B illustrate a sensor aperture 360 in the housing 110. The sensor aperture 360 allows the emitters 311, 312 to be in communication with the environment outside of the housing 110, i.e. for the emitted beam 301 to exit the side mount actuator assembly 100. A sensor aperture cover 361 may be removably positioned in the sensor aperture 360 of the housing 110 to allow the emitted beam to 301 but to prevent tampering and protection from external liquids with the sensor 300 and to provide an aesthetically pleasing look. For example, the aperture cover 361 may be transparent to infrared energy but less transmitting with respect to visible light for red and green indicators. In one embodiment, the PCB support 231 positions the sensor adjacent the sensor aperture 360. The sensor aperture 360 may be on a forward-facing portion of the housing 110. The sensor aperture cover 361 may be parallel with the PCB 230 and the portion of the housing 110 in which the sensor aperture cover 361 is positioned, but at an angle with respect to the emitter 310.

Figure 15A:
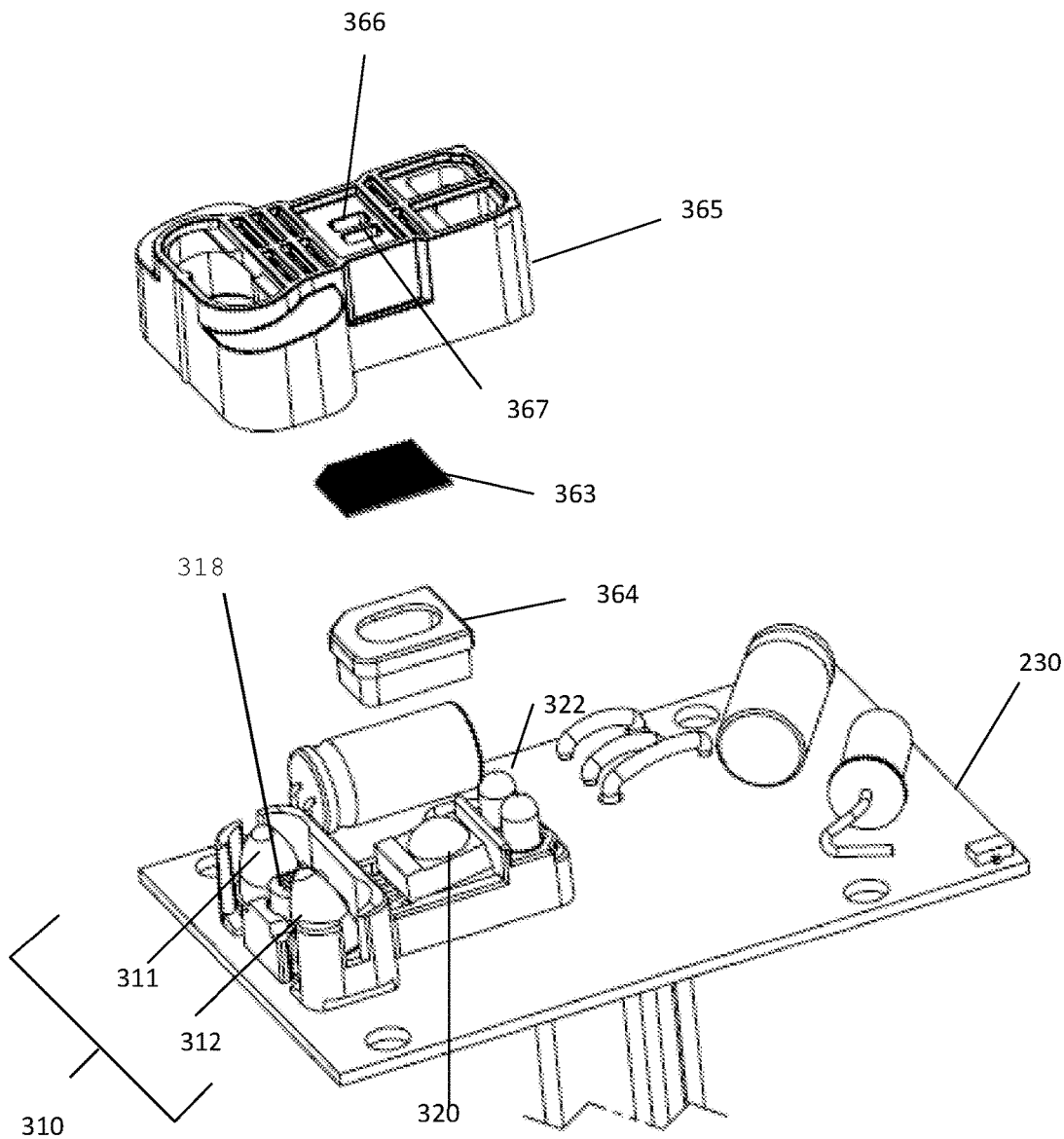
FIG. 15A illustrates an embodiment utilizing a transreflective filter.

The sensor unit 300 may also include one or more visual indicators, such as LEDs 320 (FIG. 15A). For example, the LEDs 320 may provide a visual indication, through the sensor aperture, of the status or state of the side mount actuator assembly 100.

In one embodiment, the a photocell 318 is provided. The photocell 318 is used upon manufacturing shipment, ex-factory, to extend battery life of on board installed batteries. When in packaging and at the initial power up stages of the side mount actuator assembly 100, the photocell 318 detects darkness and causes the unit to power down and conserve battery power. When the side mount actuator assembly 100 is installed and exposed to visible light, the logic causes the photocell 318 to become nonfunctional and the unit operates as intended throughout its remaining life; even if dark bathrooms are encountered.

In certain environments, too much ambient light mixing with the I.R. signal causes interference with an I.R. receiver. Interference with the sensor receiver 320 causes to high a noise level for logic to process, causing malfunction and unanticipated detection. The malfunction can manifest itself in not properly detecting valid targets. Much of this interference comes from the lighting fixtures in a restroom. There are two mechanisms in the lighting which causes receiver interference: 1) the ballast frequency which the particular ballast operates at, 2) the ballast intensity, along with the manufacturer of the light tube and the internal coating on the inside of the bulb. Electronic ballasts determine how much energy gets input into the fluorescent light tube. Interferences can also come from light and other sources such as T.V.

Figures 15B, 15C:
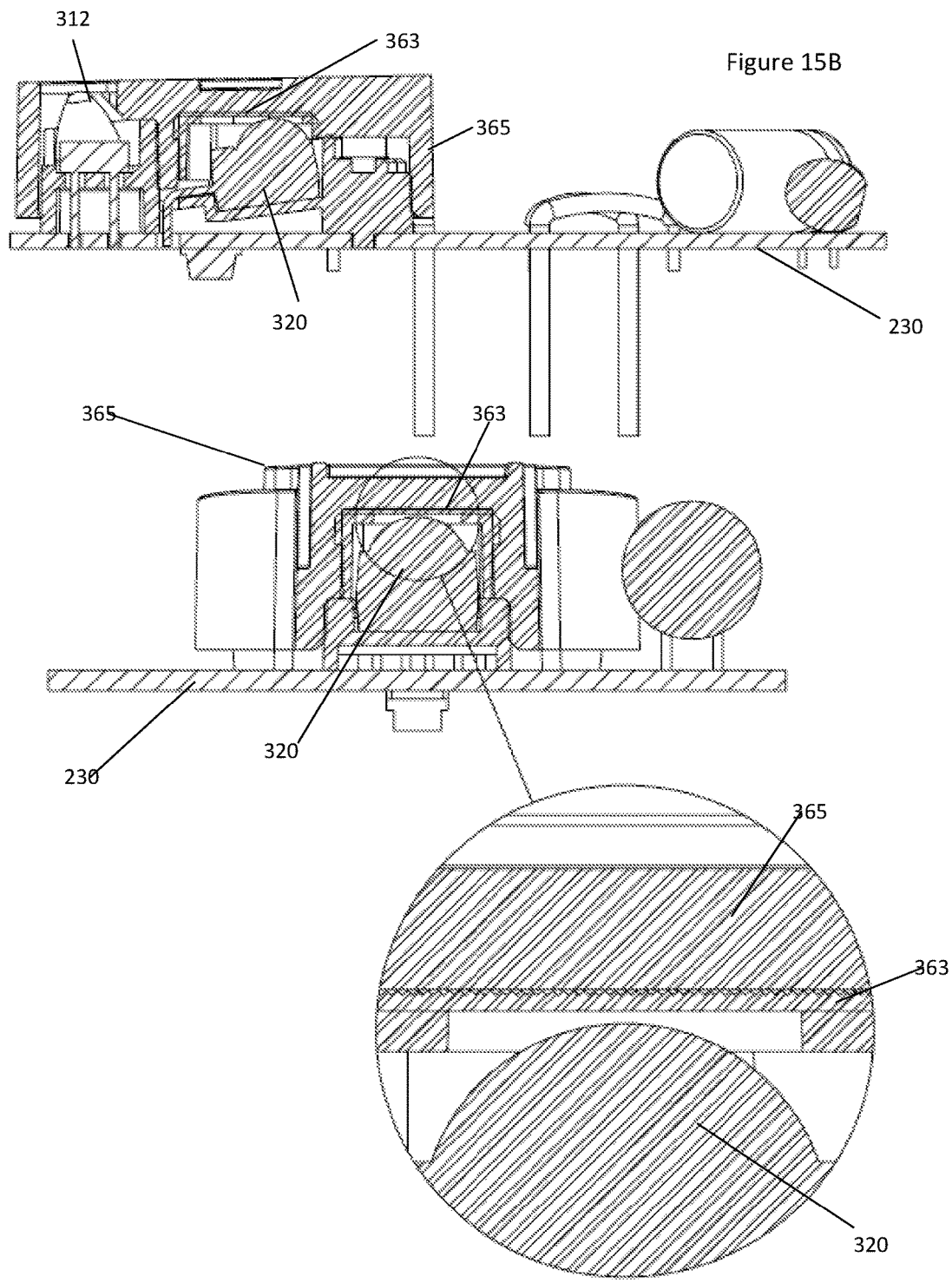
FIG. 15B illustrates a cross-section along the longitudinal axis of the sensor unit.
FIG. 15C illustrates a cross-section along the lateral axis of the sensor unit, with an inset close-up of the circled region.

In one embodiment, illustrated in FIGS. 15A-C, a transreflective filter 363 is utilized. This transreflective filter 363 decreases the background noise caused by lighting fixtures, limiting the amount of spectral interference that the sensor receiver 320 detects. In the embodiment of FIGS. 15A-C, the transreflective filter 363 is provided as a layer between the sensor 300 and the aperture cover 361. The transreflective filter 363 acts as a light filter using graduated lensing, to become sensitive only to certain incident angles. When the transreflective filter is oriented in the proper plane relative to the sensor receiver 320; it is a spatial filter fitted over the sensor 300, for example fitted over only the sensor receiver 320 not the emitters 310, optimized to maximize the signal detection of the active I.R. emitted by the sensor 300. The material causes the multiple interfering light sources to be cancelled out while being able to focus on the active I.R. beam reflection angle which is detecting to determine a valid target. More extreme angles of incident confusing light sources (sources that confuse the sensor unit 300) are filtered out causing a dramatic increase in system gain which blocks out noise sources as described above.

In an embodiment illustrated in FIG. 15A, a shroud 365 is provided that receives the emitters 311, 312 and the shroud 365 gives a partial direction block to the emitter signals. In one implementation, the shroud 365 receives the transreflective filter 336, which may be keyed to fit within the shroud and be secured by a small frame 364. The incident light goes through the receiver 320 after passing through the filter 363. Shroud 365 has blocking passages 366, 367 for upper and lower target zone detection.

Manual Actuation Assembly

Although many flush devices are designed with an automatic actuation ability, such as certain embodiments described herein, it is beneficial to provide the ability to manually flush a fixture as well. The handle 17, such as illustrated in FIG. 1A, cannot be mounted to the valve body 10 if an actuator assembly 100 is attached to the valve body 10. A manual flush may be accomplished by initiation of the motor 241 without input from the sensor unit or by physical interaction with the plunger, bypassing the motor and gear train assembly 240. One embodiment of the present invention relates to a manual actuation assembly 400 for manually actuating a flush for a flush valve having an actuator assembly 100. FIG. 3B, FIGS. 4A-D, FIG. 6A-B, and FIG. 10B best illustrate the manual actuation assembly 400.

One embodiment of a manual actuation assembly 400 includes a face plate 428 which serves as a portion of the exterior surface of the mechanism assembly 200. The manual actuation assembly 400 further includes a mechanical manual actuation assembly 401. An embodiment of the mechanical manual actuation assembly 400 includes a manual actuation arm 440 that is in communication with a button 411 disposed on the face plate 428.

In one embodiment shown in FIG. 4B the arm 440 comprises a first arm 441 and a second arm 442. The first arm 441 is connected with the button 411 and moves laterally when the button 411 is depressed inward, i.e. it moves in the same general direction as the button 411. The first arm 441 may be secured to a post 412 attached to the button 411, such as at a first end 445 of the first arm 441. The first arm 441 is connected to the second arm 442, such as pivotally connected at a second end 453, opposite the first end 445. In one embodiment, the first arm 441 serves as a linkage between the button 411 and a second arm 442. The second arm 442 is pivotally connected to the mechanism assembly frame 221, such as at the two brackets 448. In one embodiment, the second arm 442 has a generally "H" shape, with two vertical members 443a, 443b connecting to the first arm 441 at each of the vertical member first ends 454a, 454b and a bracket 448 at the vertical member second ends 446a, 446b. The second arm 442 also includes a central stabilizing member 444 connecting the vertical members 443. In one implementation, the second arm 442 is connected to the mechanism assembly frame 221 at a location below the plane of the first arm 441, for example at bracket 448 of FIG. 4D, such that movement of the first arm 441 toward the second arm 442 (and, thus, the plunger 800) results in the second arm 442 pivoting and arm 440 engaging the plunger 800 to move the plunger 800 to engage the valve stem 32, initiating a manual flush cycle. In one embodiment, a biasing mechanism 449, such as a torsion spring, may be used to bias the arm 440 away from the plunger 36, such that engagement of the button 411 is necessary to move the arm 440 to engage the plunger and release of the button 411 results in the biasing mechanism 449 returning the arm 440 to a resting state not so as not to engage the plunger 800.

Figure 8A:
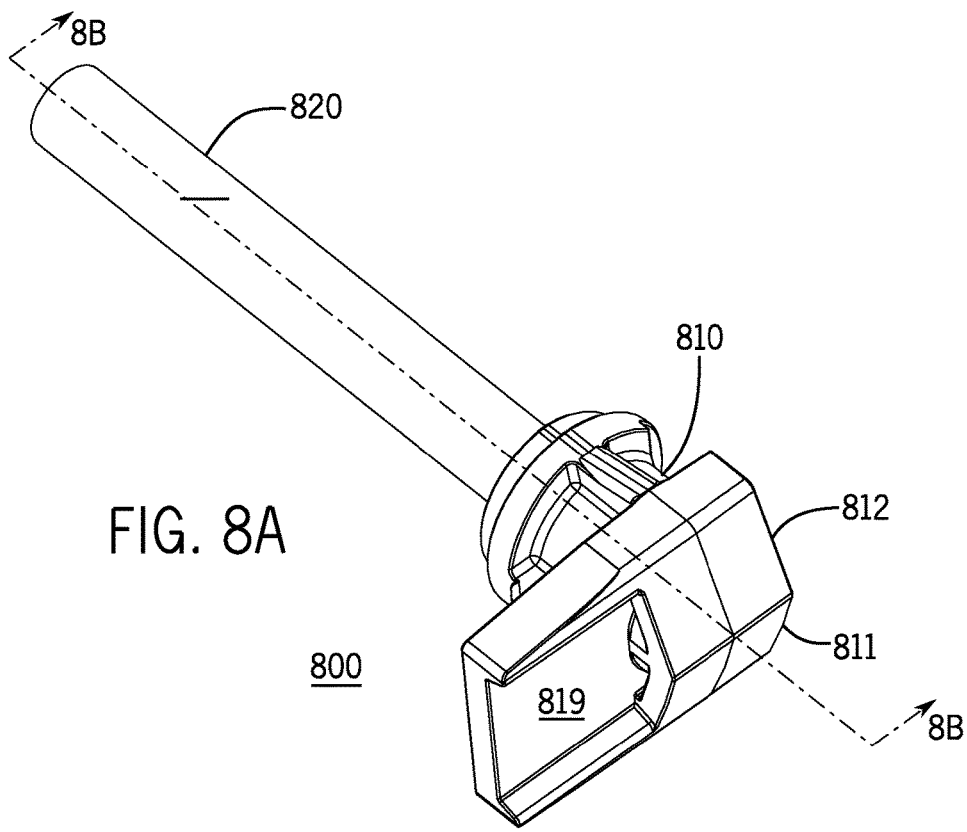
FIG. 8A is a perspective view of a plunger in accordance with one embodiment.
Figure 8B:
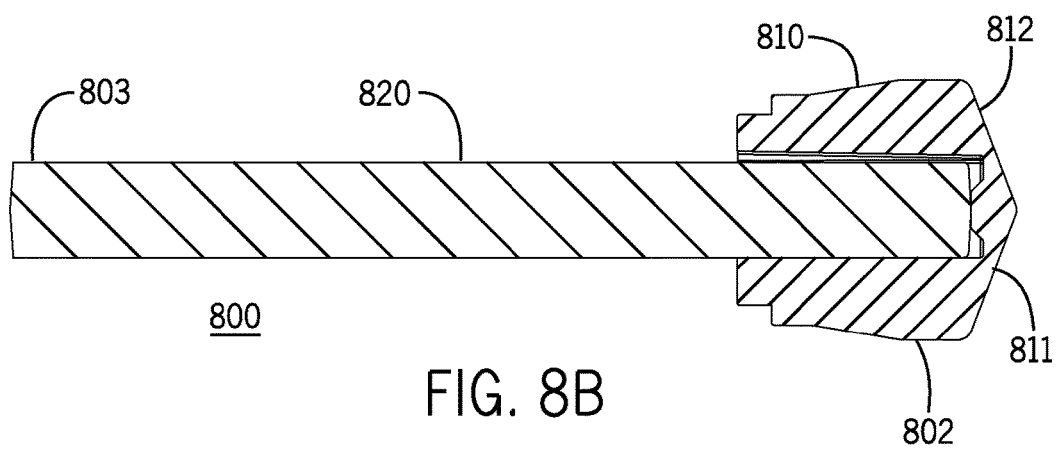
FIG. 8B is a cross-section view of the plunger of FIG. 8A along line 8B-8B.
Figure 9A:
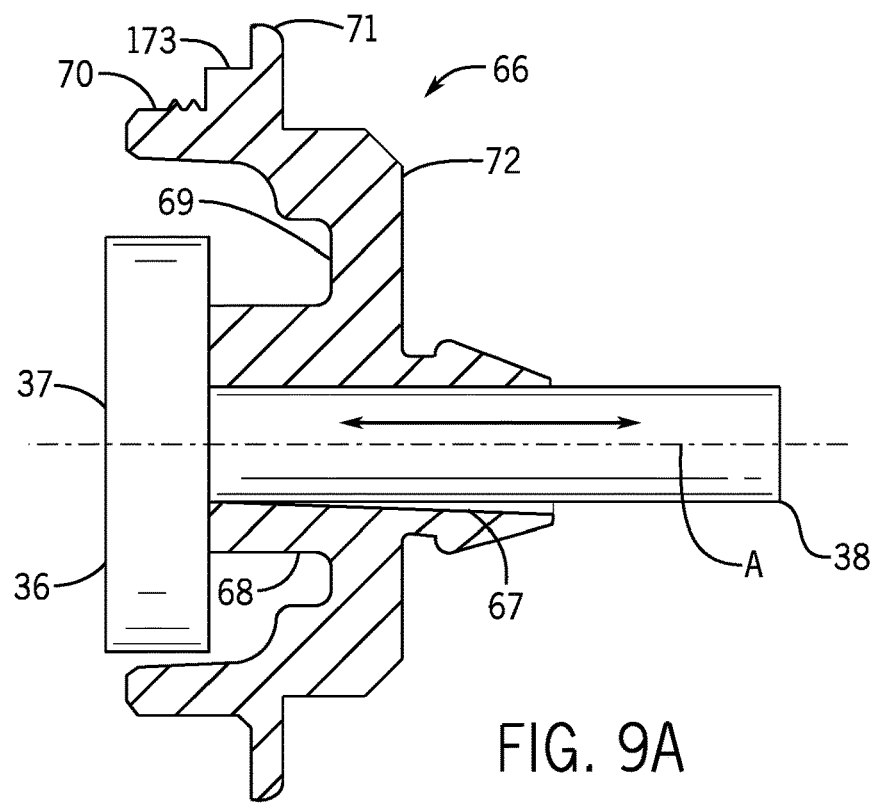
FIG. 9A is a schematic sectional representation of one embodiment of a bushing of the present invention, showing the plunger travel for a full flush.
Figure 9B:
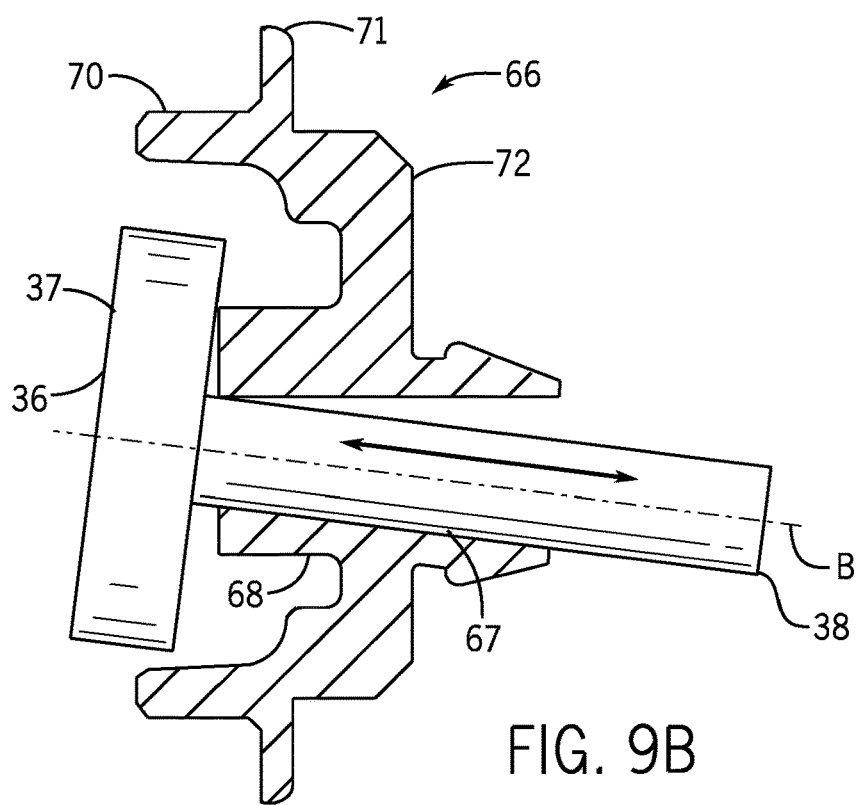
FIG. 9B is a schematic sectional representation of one embodiment of a bushing of the present invention, showing the handle and plunger travel for a partial or reduced volume flush with the angled illustrated as exaggerated for clarity regarding the relative movement.

In one embodiment, the central member 444 of the second arm 442 engages secondary plunger head, such as a protrusion 819 extending from the plunger head 810. One illustration of a plunger 800 in accordance with this embodiment is shown in FIGS. 8A-B. The protrusion 819 extends from the plunger head 810 and provides a surface for the arm 440 to engage. In one implementation, the central member 444 includes a protrusion or cam 439 for engaging the plunger head protrusion 819. For embodiments utilizing an automated actuation assembly 220 such as having rollers 510 for engaging the lower portion 811 or the upper portion 812 of the plunger head 810, the protrusion is positioned apart from but adjacent the portion of the plunger 800 that rollers 510 engage, allowing both the rollers 510 and the arm 440 to be capable of engaging the plunger 800 to effectuate an appropriate flush cycle.

Where the actuator assembly 100 is a dual flush actuator using a bushing such as illustrated in FIGS. 9A and 9B, the protrusion 819 extends to the side of the plunger head 810. A plunger head 810 as described above and shown in FIGS.

8A and 8B may be utilized with the dual mode bushing 66 shown in FIGS. 9A and 9B. When the arm 440 engages the plunger head 810, the plunger 800 travels along the lateral travel path, i.e. the plunger is not titled, resulting in the higher volume flush. It should be appreciated that where the dual mode bushing 66 is such that a lateral travel path is a reduced flush (i.e. it causes the plunger 800 to strike the valve stem 32 at a lower point than a tilted travel path), the engagement of the protrusion 819 will result in a reduced flush.

In one embodiment, such as illustrated in FIGS. 4D and 10B, a user presses the button 411, which moves the first arm 441 substantially laterally, engaging the second arm at a first end and pivoting the second arm about a pivot point at the bracket connecting a second end of the arm to the frame 221, such that the central stabilizing member 444 of the second arm 442 engages the protrusion 819 of the plunger 800.

Figure 6A:
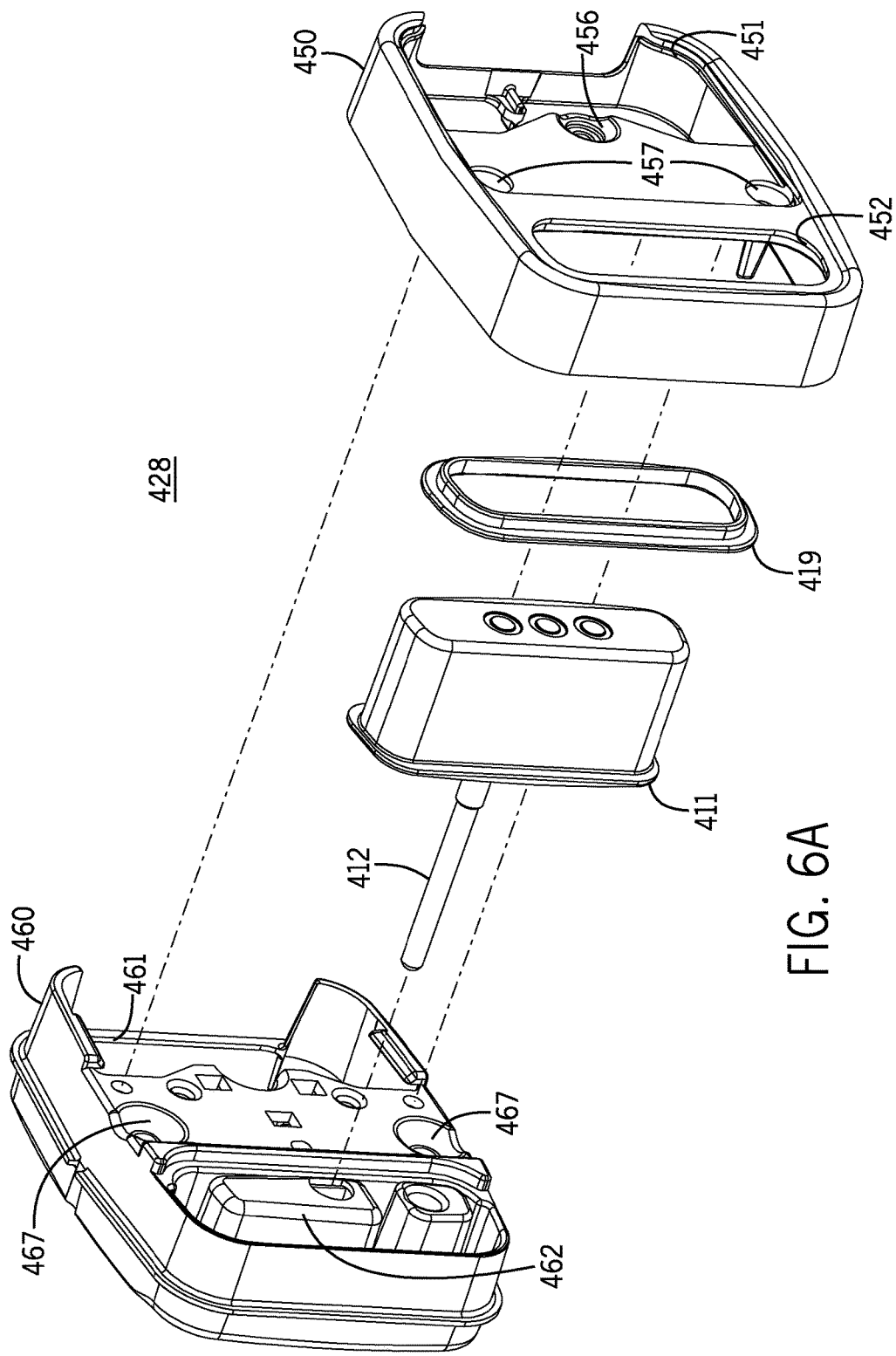
FIG. 6A is an exploded view of a manual actuation assembly faceplate having one button.

FIG. 6A illustrates an embodiment of the face plate 428 having an outer cover 450 and an inner face plate frame 460. The outer cover 450 includes a button opening 452 and a outer cover battery opening 451. The inner face plate frame 460 includes a inner face plate frame battery opening 461 and a button frame 462 which supports a button 411 that extends through the button opening 452. The button 411 may include a peripheral portion 419 secured between the outer cover 450 and inner face plate frame 460. Outer cover openings 457 correspond to inner face plate frame openings 467 to receive the fastener 190 (illustrated as an embodiment having two fasteners and corresponding openings 457, 467) to secure the mechanism assembly 200 the housing 110. In one embodiment, battery fastener outer cover openings 456 correspond to battery fastener inner face plate frame openings 466 to receive the fastener 195 to secure the battery assembly 700 to the mechanism assembly 200, with the battery assembly 700 being inserted through the battery openings 451, 461. The button 411 may include a post 412 for engaging the plunger 800 via mechanical interaction, such as through the use of arm 440.

Figure 6B:
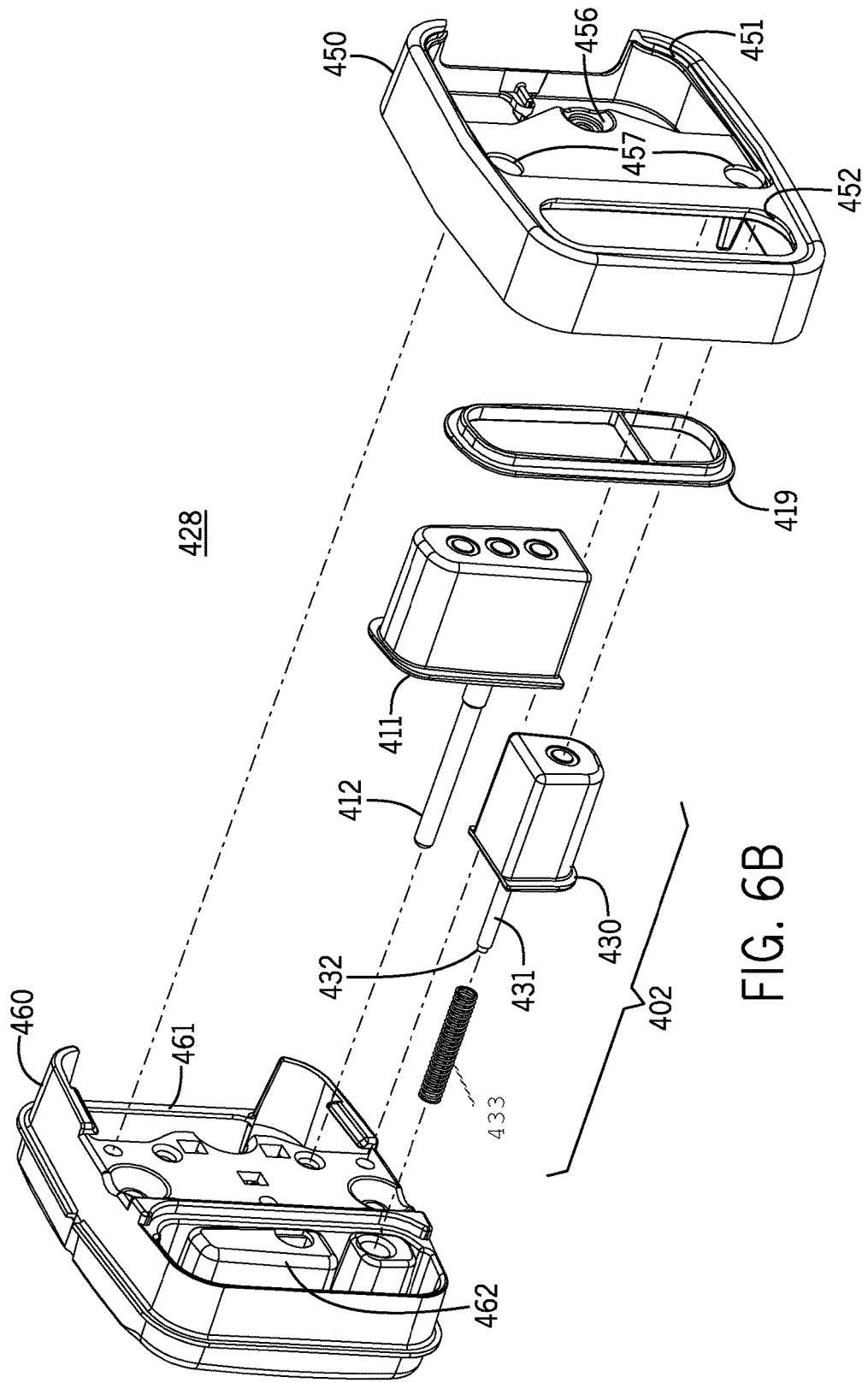
FIG. 6B is an exploded view of a multibutton manual actuation assembly faceplate.

In one embodiment, the manual actuation assembly 400 includes, either alone or in combination with the mechanical manual actuation assembly 401, a manually initiated motorized actuation assembly 402, such as the embodiment illustrated in FIG. 6B. Thus, manual actuation can be accomplished, in various embodiments, through a mechanical actuation of the plunger, i.e. bypassing the motor 241, or through a manual actuation of the motor 241, i.e. without use of the sensor unit 300. In addition to a button 411 for engaging the plunger 36 through mechanical interaction, a second button 430 may be provided to manually initiate the motor and gear train assembly 240 to start a flush cycle (a reduced or full flush, depending on the structure). The second button 430 may be similarly disposed in the button opening 452 of the outer cover 450 and have a corresponding second button post 431 and supported by a portion of the frame 462 and peripheral portion 419. The buttons 411, 430 may utilize a return spring 433 (FIG. 6B).

In one implementation, the second button 430 includes a magnet 432 (FIG. 6B) at an end of the second button post 431. The magnet is positioned to interact with a Hall Effect sensor 235 (shown in FIG. 4A) positioned on the PCB 230 when the second button 430 is depressed. The electronic components can be programmed in various ways to respond to the Hall Effect sensor 235, for example it may actuate the motor in one direction so the rollers rotate in a first rotation corresponding with a reduced flush or a second motor direction causing the rollers to rotate in a second rotation corresponding to a full flush. Thus, the second button 430 provides a mechanism, other than the sensor unit 300, for initiating the motor 241 and the rollers 510, including the possibility of a reduced flush, while the first button 411 provides a mechanical linkage mechanism for by-passing the motor and gear train assembly 240 to directly interact with the plunger 800 via the arm 440 to initiate a flush, such as a full flush. In one embodiment, the button 411 effectuates a flush for one flush volume of a dual mode flush valve and the second button 430 effectuates a flush for a second flush volume, such as a reduced flush volume, of a dual mode flush valve. It should be appreciated that the mechanical manual actuation assembly 401 and the manually initiated motorized actuation assembly 402 may both initiate the same flush volume, whether a regular flush or a reduced flush, or one may initiate a reduced flush and the other a standard volume flush.

Dual Mode Flush Valves

One group of flush valves are dual mode flush valves, i.e. flush valves that provide the ability to deliver two discrete flush volumes, typically one sufficient for solid waste evacuation and a lesser flush volume still sufficient for liquid and light paper waste evacuation. One mechanism for providing different flush volumes is to alter the height at which the plunger 36/800 contacts the gland 34. A higher point of contact will result in a longer time for the auxiliary valve 30 to clear the plunger 36/800. The auxiliary valve 30 will remain open until it has cleared the plunger 36/800. In particular, one type of dual mode flush valve is taught by U.S. Pat. No. 7,607,635, which utilizes a dual mode bushing 66 providing two different plunger travel axes that each contact the valve stem 32 at a different vertical location.

As illustrated in FIGS. 9A and 9B, the bushing 65 may be a dual mode bushing 66, such as that of the '635 patent, may be utilized for enabling dual flush modes. As previously described, the dual mode bushing 66 is typically disposed or partially disposed within the handle opening 15. Certain implementations may utilize a general bushing 65, while dual flush embodiments described herein may utilize a dual mode bushing 66. The dual mode bushing 66 includes a bushing plunger passage 67 adapted to receive the plunger 36 and for guiding the plunger to the gland 34. The dual mode bushing 66 also serves to prevent water from exiting the valve body 10 though the handle opening 15. FIG. 2 illustrates a gasket 80 that may be used to provide a water-tight seal between the dual mode bushing 66 and the valve body 10. A plunger gasket 81 provides a water-tight seal at the end of the bushing passage adjacent the valve stem 32 (FIG. 1B).

The dual mode bushing 66 allows the plunger to tilt within the dual mode bushing 66 such that the plunger 36 will strike the gland 34 at different vertical heights. In one embodiment, the dual mode bushing 66 has an enlarged opening adjacent the valve stem and includes two paths "A" and "B" of plunger travel, which allow the plunger 36 to strike the valve stem 32 at two different vertical locations depending on the path of travel. As explained in the '635 patent, the vertical location on the gland 34 that the plunger 36 strikes impacts the flush volume, with a high strike point being correlated with larger flush volumes. As set forth in the '635 patent, the tilting of the handle 17 allows for engagement of a peripheral portion of the plunger head resulting in a moment. In the dual mode bushing 66, an enlarged portion of the bushing plunger passage 67 allows the plunger 36 to tilt, when aligned vertically to lay in the vertical plane, depending where the peripheral portion of the plunger head 37 is engaged. It will be understood that the bushing plunger passage 67 will not allow the plunger to tilt in any direction, but only when actuated in line with the enlarged portion to allow tilting. In one embodiment, the dual mode bushing 66 includes an outer skirt 70 and a bushing central sleeve 68, connected via a wall 72. The central sleeve 68 further defines the bushing plunger passage 67 of the dual mode bushing 66 for receiving the plunger 36. The plunger 36 described above moves laterally through the dual mode bushing 66 to contact the valve stem 32. The mechanism of actuating the flush valve 1 must provide a motive force to move the plunger 36.

In one embodiment, the present invention relates to a side mount actuator assembly 100 for selectively engaging a plunger 36 guided by the dual mode bushing 66 to effectuate one of two flush modes: a high volume sufficient for solid waste or a lower volume for conserving water, but sufficient for liquid and light paper waste, such as a 30% reduction from a "standard" flush (higher relative volume). The actuator assembly 100 engages the plunger 800 to move along either the first plunger travel path "A" or the second plunger travel path "B" to effectuate the desired flush volume. The actuator assembly 100 may be utilized in place of a manual handle 17.

With respect to FIGS. 8A and 8B, one implementation of a plunger 800 is illustrated for use with a manual actuation assembly 400. It should be appreciated that a plunger 36 may be used with various implementations and that plunger 800 may be used with, for example, the described embodiments having the manual actuation assembly 400. The plunger 800 comprises a plunger head 810 and a plunger shank 820 connected thereto. The plunger head 810 is positioned at a first (outer, with respect to the valve body 10) end 802 of the plunger 800. The plunger shank 820 extends from the plunger head 810 to the second (inner, with respect to the valve body 10) end 803 of the plunger 800, adjacent the valve stem 32. At a first side opposite the plunger shank 820, the plunger head 810 tapers from a center to the perimeter. The plunger head 810 includes a lower portion 811 and an upper portion 812 In one embodiment, the plunger head 810 at least two angled surfaces, corresponding to lower portion 811 and upper portion 812, respectfully, that provide a follower surface for interaction with the automated actuation assembly 220 as further described below. In one embodiment, the lower portion and upper portion are not in the same plane, with the lower portion 811 and upper portion 812 each comprising one or more faces of a polyhedron. In an alternative implementation, the plunger head comprises a curved surface, such as forming a frustum, semi-ellipsoid, semi-paraboloid, semi-spheroid or semi-sphere, with the lower portion 811 and the upper portion 812 each corresponding to an opposite portion of the curved surface.

The automated actuation assembly 220 for use with a dual flush mode flush device is best illustrated in FIGS. 4A-D. In addition to the components described above, one embodiment of the automated actuation assembly 220 includes as part of the gear train 242 a roller system 500. Rotation of the motor 241, such as a traditional small electric motor spinning a drive shaft, rotates a gear 243 in the gear train 242. Rotation of the gear train 242 engages the plunger 800.

Figure 5B:
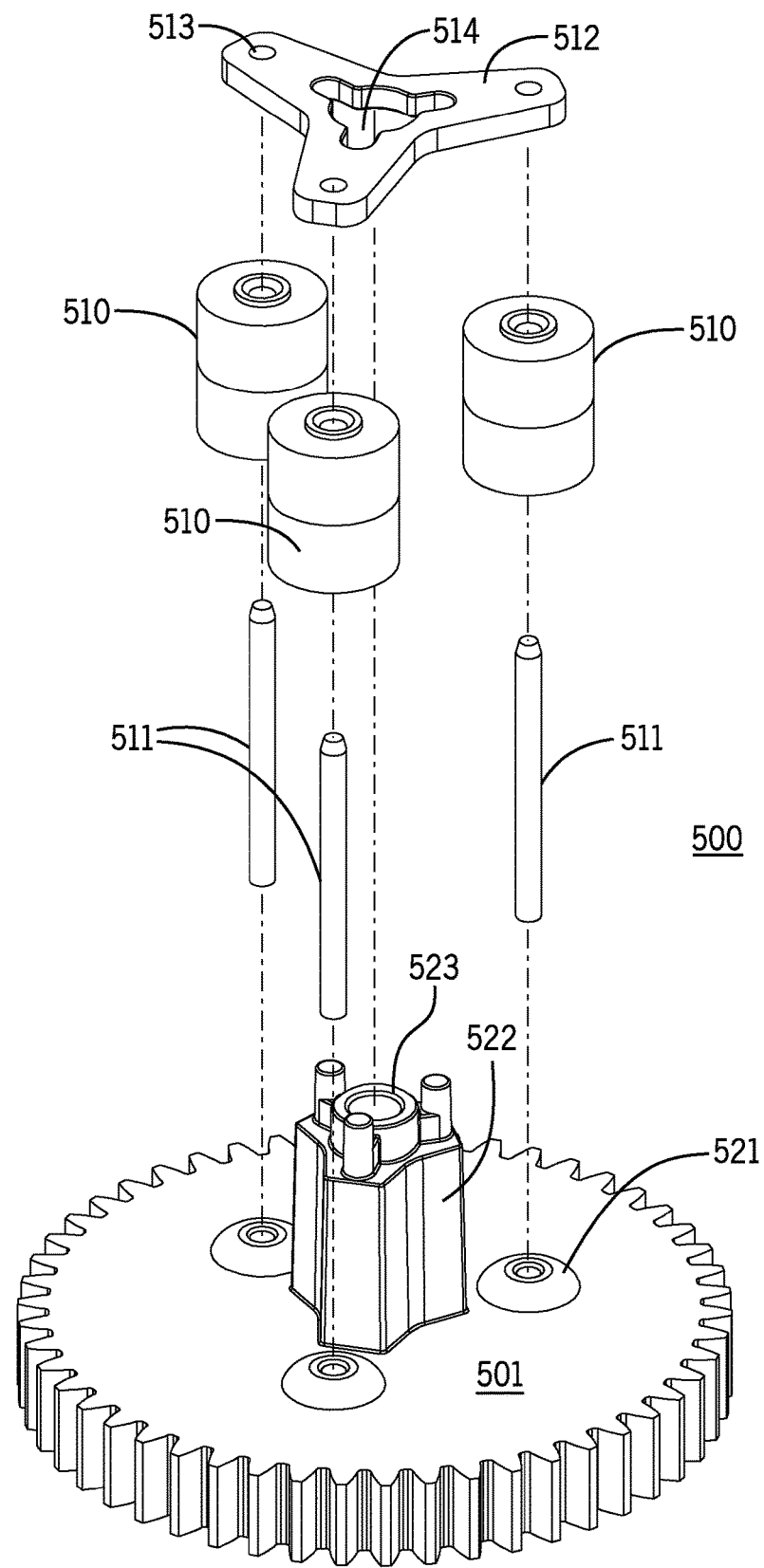
FIG. 5B is an exploded view of the roller system.
Figure 10C:
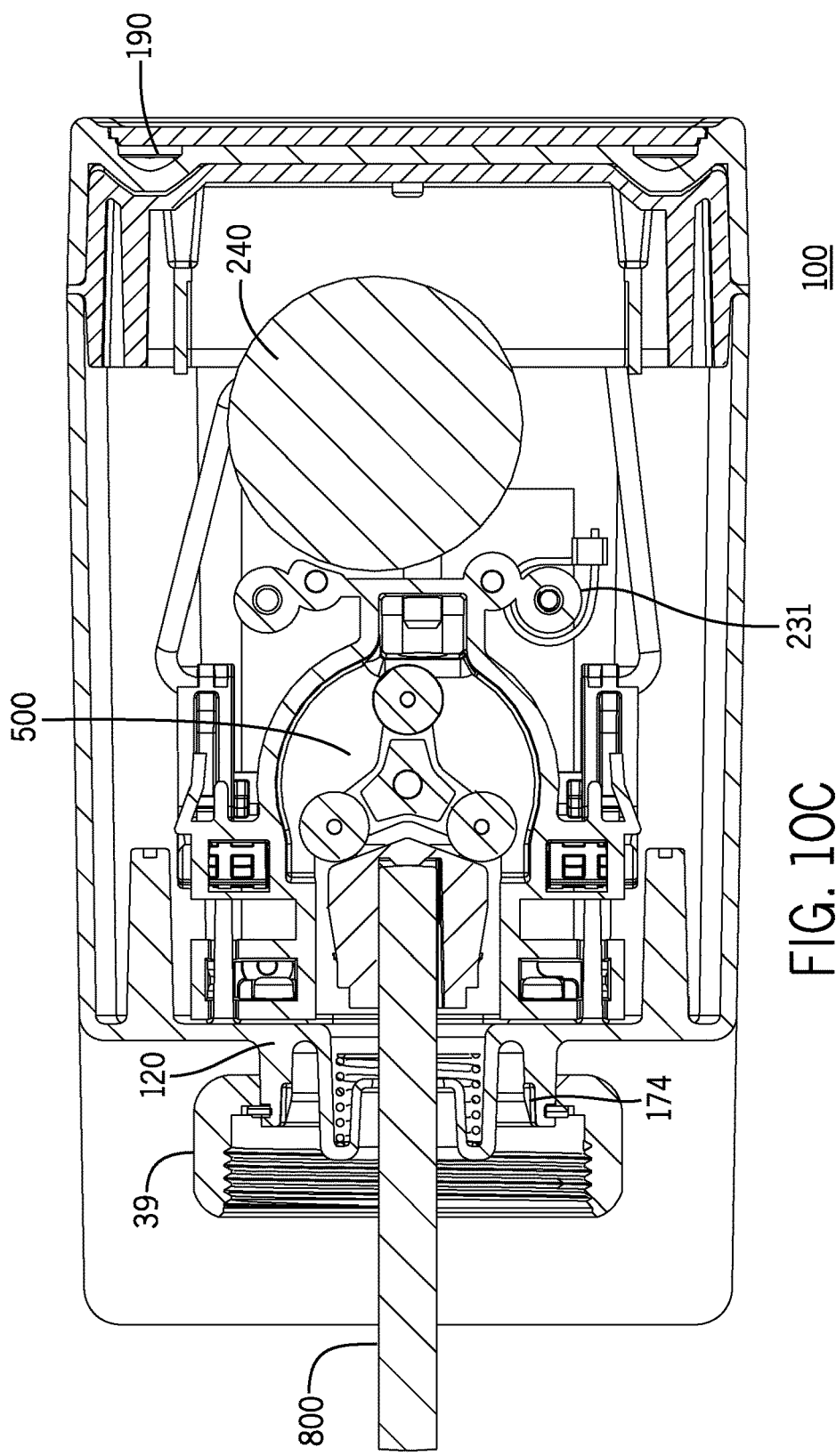
FIG. 10C is a vertical cross-sectional along line 10C-10C of FIG. 10A.

In one embodiment, illustrated in FIG. 5B, one or more rollers 510 are positioned on a rotating platform, such as a roller support gear 501. One or more rollers 510 are connected to the roller support gear 501, wherein the one or more rollers 510 are spaced from the center of the roller support gear 501 such that the one or more rollers 510 travel a path about the center when the roller support gear 501 is rotated. The one or more rollers 510 are configured to engage the plunger head 810 as a cam. For example, as illustrated in FIG. 11, the rollers 510 may be positioned to rotate generally in the vertical plane such the that plunger is engaged with an upward curving rotation or a downward curving rotation of the rollers 510. In one implementation, the one or more rollers 510 are rotatable in a clockwise or counterclockwise direction. For example, when the motor 241 is run "forward" the one or more rollers 510 rotate in one direction and when the motor 241 is run in "reverse" the one or more rollers 510 rotate in the opposite direction. In one implementation, rotation in a clockwise direction results in at least one of the rollers 510 engaging the lower portion 811 of the plunger 800 and rotation in a counterclockwise direction results in at least one of the rollers 510 engaging the upper portion 812 of the plunger 800. FIG. 11 and FIG. 10C best illustrate the spatial arrangement of the components, including the positioning of the rollers 510 relative to the plunger head 810.

In one embodiment program logic is utilized to control the motor. For side mount actuator assemblies having dual mode flush capabilities, such as utilizing a dual mode bushing 66, the program logic, in one embodiment, utilizes input from the sensor unit 300 and applies logical instructions, such as computer program code, to determine if a reduced flush or a normal volume flush should be utilized. For example, where rotation of the motor in a clockwise direction achieves a reduced flush, the program logic will initiate a clockwise rotation of the motor when the sensor unit indicates only a short direction presence indicative of a liquid waste event. In contrast, upon detection of a longer presence, the program logic initiates rotation of the motor in a counter clockwise direction to effectuate a normal flush as the sensor unit's input is indicative of a solid waste event.

It should be appreciated that the actuator assembly 100 may be mounted in a "left hand" or "right hand" position with respect to the valve body 10. A single actuator assembly 100 may be useable in either position by allowing an installer to select the orientation of installation. The actuator assembly 100 is right-side up in one orientation and upside down, respectively, in the other. Therefore, in one implementation, the direction of rotation of the motor 241, and thus the one or more rollers 510, associated with a particular flush volume is reversed between the left-handed installation and the right-handed installation. A switch (not shown) may be provided on the PCB 230 to accomplish the change in relationship between the motor rotation and the flush volume. A tilt sensor (not shown) may be provided on the PCB 230 to provide an indication of orientation of the actuator assembly 100, and thus the type of installation, i.e. left hand or right hand, where the actuator assembly 100 is right-side up for one of a left hand or right hand installation and upside down in the other installation. In one embodiment, the dual mode bushing 66 is keyed to match the receptacle 120 as described previously and the keying is such to accommodate either a left-hand or right-hand position. In one embodiment, the bushing 65 (including if a dual mode bushing 66 is utilized) is a separate and distinct component from the side mount actuator assembly 100. Thus, the bushing 65 may be rotated separately for a left-hand or right-hand installation as necessary, particularly if a dual mode bushing 66 is utilized to ensure proper location of the dual mode bushing 66 for achieving a reduced flush.

In one embodiment illustrated in FIGS. 5A and 5B, the one or more rollers 510 are connected to the roller support gear 501 by pins 511 that engage gear pin holes 521 and pin holes 513 in a top plate 512 that is secured to the roller support gear 501 such as by protrusion 522 that mates with an opening 514 in the top plate 512. A support shaft 530 may pass through the top plate opening 514 and an protrusion opening 523 to support the roller system 500.

The use of the dual mode bushing 66 allows the plunger 800 to tilt where the action of the rollers 510 or manual action (discussed below) creates a sufficient moment with a specific vector to tilt the plunger 800 in the dual mode bushing 66. The plunger 36 is aligned within the dual mode bushing 66 such that the upper portion 812 corresponds with the top of the dual mode bushing 66, which has an angled portion to allow the plunger 800 to tilt the end adjacent the valve stem 32 downward. This downward tilt of the plunger end results in a lower flush volume as described in U.S. Pat. No. 7,607,635. Rotation of the rollers 510 in a first direction, engaging the upper portion 812, results in lateral movement of the plunger to engage the flush valve stem at a first location and a "normal" flush volume sufficient for solid waste. Rotation of the rollers 510 in a second direction, engaging the lower portion 811, results in a tilting of the plunger 800 and lateral movement of the plunger 800 to engage the flush valve stem 32 at a location below the first location effectuating a "reduced" flush volume that remains sufficient for liquid—but not intended for solid waste. The reduction may be from a normal flush volume of about 1.6 gpf to a reduced 1.3 gbf. In one embodiment, the reduction may be 30% from a "normal" flush.

Battery Tray

Figure 7:
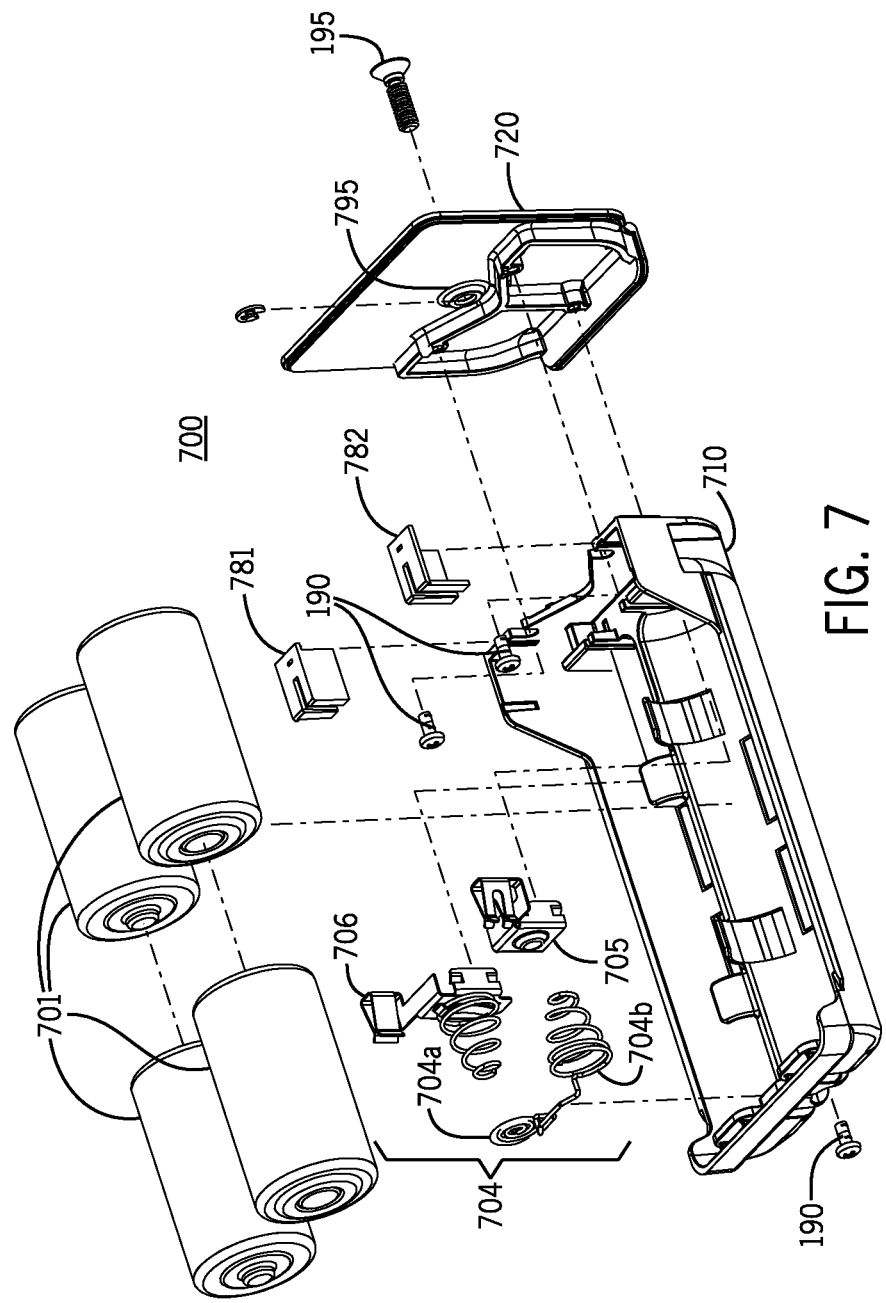
FIG. 7 is an exploded view of a battery assembly.

In one embodiment portable energy sources are utilized, such as batteries 701. A battery assembly 700 may be provided. The battery assembly 700 may be as shown in FIG. 7. The battery assembly 700 is configured to be disposed within the housing 110.

In one embodiment, the battery assembly 700 includes batteries 701 insertable into a tray 710 having at one end a first linked pair of electrodes 704 wherein one of the pair is a positive electrode (e.g., 704a) and the other a negative (e.g., negative electrode 704b) and at a second, opposite, end a set of unlinked electrodes 705, 706 (such as a positive electrode 705 opposite negative electrode 704b and a negative electrode 706 opposite positive electrode 704a). Each electrode 704a, 704b, 705, 706 is conductively connected to the support plate 280. The blade electrodes 781, 782 are configured to receive a corresponding blade 281, 282, respectively. The blades 281, 282 are connected to the mechanism assembly frame 221. The assembly frame 221 is in conductive communication with the PCB 230 to provide electricity to the electrical components.

A spring contact 740 may be provided in one embodiment within the housing 110 to assist in removal of the battery assembly 700. In one embodiment, the battery assembly 700 includes a battery assembly cover 720 covering outer cover openings 456 and fasteners 195 to provide a more aesthetic look and to hinder tampering with the actuator assembly 100. The battery assembly 700 may be affixed to the mechanism assembly 200 by a battery assembly fastener 195, such as a screw, that engages a battery assembly hole 795 in the cover 720 and the battery fastener outer cover opening 456 in the face plate 428.

One embodiment of the invention relates to a complete flushometer valve assembly, such as either a diaphragm valve or a piston valve, with the bushing being a dual flush mode bushing and the actuator assembly being a side mount automatic actuator, such as for new construction installation.

An alternative embodiment comprises only the actuator assembly, such as for converting existing installed dual mode valve bodies to automatic flush systems. Alternatively, one embodiment relates to the actuator assembly and a dual flush mode bushing, such as for converting existing single mode flush valves to automatic dual mode flush valves.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Furthermore, headings are provided as a visual aid and should not be construed to limit the scope of the invention.

It is to be understood that such depicted architectures are merely exemplary, and that in fact many other architectures can be implemented which achieve the same functionality. In a conceptual sense, any arrangement of components to achieve the same functionality is effectively "associated", "coupled" or "connected" such that the desired functionality is achieved. Hence, any two components herein combined to achieve a particular functionality can be seen as "associated with" each other such that the desired functionality is achieved, irrespective of architectures or intermedial components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least"). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An automatic actuation assembly for a flush valve comprising;
   an actuator assembly housing having a sensor aperture; and
   a sensor assembly positioned adjacent the sensor aperture and having a first angled emitter, a second angled emitter and a sensor receiver, the first angled emitter and the second angled emitter being non-parallel and non-perpendicular to a vertical longitudinal plane of the actuator assembly housing;
   wherein the sensor receiver and at least one of the first angled emitter and the second angled emitter are at an angle respect to each other, the sensor receiver positioned to not receive rays emitted by the at least one of the first angled emitter and the second angled emitter that are specularly reflected.

2. The automatic actuation assembly of claim 1, wherein the first angled emitter and the second angled emitter are non-parallel and non-perpendicular to a horizontal longitudinal plane of the automatic actuation assembly.

3. The automatic actuation assembly of claim 2, wherein the first angled emitter and the second angled emitter are 2-15 degrees with respect to the horizontal plane and 6-30 degrees with respect to the vertical plane.

4. The automatic actuation assembly of claim 2, wherein the first angled emitter and the second angled emitter are 5-11 degrees with respect to the horizontal plane and 12-20 degrees with respect to the vertical plane.

5. The automatic actuation assembly of claim 2, wherein the sensor receiver is angled 5-11 degrees from perpendicular with respect to the horizontal longitudinal plane.

6. The automatic actuation assembly of claim 1 further comprising a sensor aperture cover engageable with the sensor aperture, the sensor aperture cover being transparent to an emitted beam of both the first angled emitter and the second angled emitter, the automatic actuation assembly further comprising a tilt sensor.

7. The automatic actuation assembly of claim 1, comprising a transreflective filter engaged with the sensor receiver.

8. The automatic actuation assembly of claim 7 further comprising the transreflective filter positioned between the sensor aperture and the sensor aperture cover.

9. An automatic actuation assembly for a flush valve comprising;
   an actuator assembly housing having a sensor aperture;
   a receptacle extending from the actuator assembly housing and comprising an outer ring disposed about a receptacle plunger passage;
   a sensor assembly positioned adjacent the sensor aperture and having a first angled emitter, a second angled emitter and a sensor receiver, the first angled emitter and the second angled emitter being non-parallel and non-perpendicular to a vertical longitudinal plane of the actuator assembly housing;
   a retention flange engageable with the receptacle, the retention flange having an outer diameter greater than an outer diameter of the outer ring; and
   a plunger having a plunger head at an outer end and a shank extending there from to an inner end, the plunger head disposed within the actuator assembly housing and the plunger shank axially slidable in the receptacle plunger passage.

10. The automatic actuation assembly of claim 9, the receptacle further comprising an inner ring disposed about the receptacle plunger passage, between the receptacle plunger passage and the outer ring and a receptacle annular gap defined between the inner ring and the outer ring.

11. The automatic actuation assembly of claim 9, further comprising a bushing removably engageable with the receptacle, the bushing having a bushing plunger passage for slidably receiving the plunger.

12. The automatic actuation assembly of claim 11, wherein the bushing includes a bushing outer skirt, the bushing outer skirt at least partially disposed within the receptacle annular gap and the receptacle plunger passage and bushing plunger passage aligned to receive the plunger.

13. The automatic actuation assembly of claim 9, further comprising a transreflective filter positioned between the sensor aperture and a sensor aperture cover.

14. An automatic flush actuation assembly comprising;
   an actuator assembly housing having a sensor aperture and a mechanism assembly;
   a sensor assembly positioned adjacent the sensor aperture and having a first angled emitter, a second angled emitter and an sensor receiver, the first angled emitter and the second angled emitter being non-parallel and non-perpendicular to a vertical longitudinal plane of the actuator assembly housing;
   the actuator assembly housing having a housing plunger passage;
   a plunger having a plunger head at an outer end and a shank extending there from to an inner end, the plunger head disposed within the actuator assembly housing and the plunger shank axially slidable disposed in the housing plunger passage;
   the mechanism assembly including a mechanism frame supporting a gear train assembly;
   the gear train assembly including a motor coupled to at least one gear and a roller system;
   the roller system including a support gear and one or more rollers positioned a distance from the center of the support gear; the roller system positioned adjacent the plunger for direct engagement of the plunger head; and
   a manual actuation assembly at least partially disposed within the actuator assembly housing, the manual actuation assembly including a face plate having a button coupled to a manual actuation arm, the manual actuation arm positioned adjacent the plunger and engageable with the plunger when the button is depressed;

wherein the sensor receiver and the at least one of the first angled emitter and the second angled emitter are at an angle respect to each other, the sensor receiver positioned to not receive rays emitted by the at least one of the first angled emitter and the second angled emitter that are specularly reflected.

15. The automatic flush actuation assembly of claim 14, wherein the manual actuation arm comprises a first arm and a second arm, the first arm coupled at a first end to the button and at a second end of the first arm to a first end of the second arm, a second end of the second arm coupled to the mechanism frame.

16. The automatic flush actuation assembly of claim 15 wherein the second end of the second arm is pivotally coupled to the mechanism frame and is positioned below the first arm and the first end of the second arm.

17. The automatic flush actuation assembly of claim 16, wherein the plunger includes a protrusion from the plunger head and the manual actuation arm is engageable with the protrusion.

18. The automatic flush actuation assembly of claim 17, actuation of the button laterally moves the first arm and pivots the second arm, the second arm engaging the protrusion.

19. The automatic flush actuation assembly of claim 14 wherein the manual actuation assembly further comprises a manually initiated motorized actuation assembly.

20. The automatic flush actuation assembly of claim 19 wherein the manually initiated motorized actuation assembly comprises a second button of the face plate, the second button in communication with the motor and gear assembly through a printed circuit board.

* * * * *